United States Patent
Son et al.

(10) Patent No.: US 10,470,131 B2
(45) Date of Patent: Nov. 5, 2019

(54) ELECTRONIC DEVICE FOR CONTROLLING COMMUNICATION CIRCUIT BASED ON IDENTIFICATION INFORMATION RECEIVED FROM EXTERNAL DEVICE AND OPERATION METHOD THEREOF

(71) Applicant: SAMSUNG ELECTRONICS CO., LTD., Suwon-si, Gyeonggi-do (KR)

(72) Inventors: Dong-Il Son, Hwaseong-si (KR); A-Reum Choi, Suwon-si (KR); Sun-Min Hwang, Hwaseong-si (KR); Ga-Jin Song, Anyang-si (KR); Ki-Ho Cho, Yongin-si (KR); Jong-Sung Joo, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/039,616

(22) Filed: Jul. 19, 2018

(65) Prior Publication Data

US 2019/0037499 A1 Jan. 31, 2019

(30) Foreign Application Priority Data

Jul. 25, 2017 (KR) ........................ 10-2017-0094102

(51) Int. Cl.
| | |
|---|---|
| *H04W 52/02* | (2009.01) |
| *G08G 1/16* | (2006.01) |
| *H04W 4/02* | (2018.01) |
| *H04W 4/40* | (2018.01) |
| *G06F 3/00* | (2006.01) |
| *G08G 1/09* | (2006.01) |
| *G08G 1/0967* | (2006.01) |
| *H04L 29/06* | (2006.01) |

(52) U.S. Cl.
CPC .......... *H04W 52/0251* (2013.01); *G06F 3/00* (2013.01); *G08G 1/094* (2013.01);
(Continued)

(58) Field of Classification Search
CPC ... H04W 52/0251; H04W 4/40; H04W 4/025; G08G 1/161; G08G 1/094;
(Continued)

(56) References Cited

U.S. PATENT DOCUMENTS

| | | | |
|---|---|---|---|
| 9,830,816 B1* | 11/2017 | Murray | ............ G08G 1/096791 |
| 2005/0073438 A1* | 4/2005 | Rodgers | ................. G08G 1/161 |
| | | | 340/944 |

(Continued)

FOREIGN PATENT DOCUMENTS

| | | |
|---|---|---|
| JP | 2015-032312 | 2/2015 |
| KR | 10-2016-0110006 | 9/2016 |

*Primary Examiner* — Mong-Thuy T Tran
(74) *Attorney, Agent, or Firm* — Nixon & Vanderhye P.C.

(57) ABSTRACT

An electronic device according to various embodiments may include a communication circuit, including a reception circuit and a transmission circuit, and a processor. The processor may be configured to: receive at least one piece of identification information corresponding to at least one external electronic device for providing a traffic-related signal to at least one vehicle outside the electronic device, via the reception circuit, identify the position of the electronic device, based at least on the at least one piece of identification information, and activate the transmission circuit to transmit movement-related information of the electronic device to the at least one vehicle or the at least one external electronic device, based at least on the position.

15 Claims, 25 Drawing Sheets

(52) U.S. Cl.
CPC ... *G08G 1/09675* (2013.01); *G08G 1/096716* (2013.01); *G08G 1/096783* (2013.01); *G08G 1/096791* (2013.01); *G08G 1/161* (2013.01); *H04L 63/10* (2013.01); *H04W 4/025* (2013.01); *H04W 4/40* (2018.02); *G08G 1/162* (2013.01); *G08G 1/163* (2013.01)

(58) Field of Classification Search
CPC ......... G08G 1/096716; G08G 1/09675; G08G 1/096783; G08G 1/096791; G08G 1/162; G08G 1/163; G06F 3/00; H04L 63/10
USPC ........................................................ 455/574
See application file for complete search history.

(56) References Cited

U.S. PATENT DOCUMENTS

| | | | |
|---|---|---|---|
| 2007/0273551 A1* | 11/2007 | Jacobs | G08G 1/0962 340/902 |
| 2009/0224942 A1* | 9/2009 | Goudy | G08G 1/096783 340/905 |
| 2010/0169009 A1* | 7/2010 | Breed | B60N 2/2863 701/301 |
| 2013/0201036 A1* | 8/2013 | Stahlin | A43B 3/00 340/944 |
| 2013/0314253 A1* | 11/2013 | Mizuguchi | G08G 1/161 340/905 |
| 2014/0045556 A1* | 2/2014 | Subramanian | H04W 52/0251 455/574 |
| 2015/0010212 A1* | 1/2015 | Segarra | G08G 1/09626 382/104 |
| 2015/0035685 A1 | 2/2015 | Strickland et al. | |
| 2016/0169688 A1* | 6/2016 | Kweon | G08G 1/087 701/522 |
| 2017/0018187 A1* | 1/2017 | Kim | G08G 1/166 |
| 2017/0092126 A1* | 3/2017 | Oshida | G08G 1/096791 |
| 2017/0132929 A1* | 5/2017 | Mays | G08G 1/161 |
| 2018/0018888 A1* | 1/2018 | Townsend | B60Q 9/008 |
| 2018/0302768 A1* | 10/2018 | Uchiyama | G08G 1/166 |
| 2019/0011925 A1* | 1/2019 | Bansal | G05D 1/0214 |

\* cited by examiner

| 701 | 702 | 703 | 704 | 705 | 706 | 707 | 708 | 709 | 710 | 711 |
|---|---|---|---|---|---|---|---|---|---|---|
| BASIC TYPE | SEC MARK | MSG COUNT | ID | POSITION | ACCURACY | SPEED | HEADING | ACCELSET | PATH HISTORY | PROPULSION |

| 712 | 713 | 714 | 715 | 716 | 717 | 718 | 719 | 720 | 721 | 722 | 723 |
|---|---|---|---|---|---|---|---|---|---|---|---|
| USE STATE | CROSS REQUEST | CROSS STATE | CLUSTER SIZE | EVENT RESPONDER TYPE | ACTIVITY TYPE | ACTIVITY SUB-TYPE | ASSIST TYPE | SIZING | ATTACHMENT | ATTACHMENT RADIUS | ANIMAL TYPE |

FIG.7

ELECTRONIC DEVICE FOR CONTROLLING COMMUNICATION CIRCUIT BASED ON IDENTIFICATION INFORMATION RECEIVED FROM EXTERNAL DEVICE AND OPERATION METHOD THEREOF

CROSS-REFERENCE TO RELATED APPLICATION

This application is based on and claims priority under 35 U.S.C. § 119 to Korean Patent Application No. 10-2017-0094102, filed on Jul. 25, 2017 in the Korean Intellectual Property Office, the disclosure of which is incorporated by reference herein in its entirety.

BACKGROUND

1. Field

The present disclosure relates to an electronic device for performing communication and an operation method thereof.

2. Description of Related Art

Recently, technology in which a vehicle communicates with another entity, such as a car, has been developed. The vehicle may include a communication circuit for communication, and may transmit various information, such as the speed of the vehicle, the direction of steering, whether a brake operates or not, or the like, to another entity via the communication circuit. For example, the vehicle may transmit information to another vehicle, and may receive information from another vehicle. Such communication between vehicles may be referred to as Vehicle-to-Vehicle (V2V) communication. Also, the vehicle may transmit information to a Roadside Unit (RSU), and may receive information from an RSU. Such communication between a vehicle and an RSU is referred to as Vehicle-to-Infrastructure (V2I) communication. Also, the vehicle may transmit information to an electronic device carried by a pedestrian, and may receive a communication signal including safety-related information from an electronic device carried by a pedestrian. The communication between a vehicle and a pedestrian is referred to as Vehicle-to-Pedestrian (V2P) communication. An electronic device (e.g., a smart phone or a wearable electronic device) carried by a pedestrian may obtain and transmit, to a vehicle, various information such as the speed of a pedestrian, the location of the pedestrian, and information associated with whether the pedestrian is going across a crosswalk. Alternatively, the electronic device carried by the pedestrian may transfer the obtained information to an RSU, and the RSU may share the received information with vehicles. Operation of the vehicle may be controlled based on the received information, whereby the safety of a pedestrian may be secured.

As described above, an electronic device carried by a pedestrian may transmit periodically or aperiodically obtained information to a vehicle or a Roadside Unit (RSU). The vehicle may include a large-capacity battery therein. The RSU receives power wiredly. The electronic device carried by the pedestrian may include a relatively small-capacity battery. When the electronic device carried by the pedestrian continuously transmits information for safety, the battery of the electronic device may be exhausted within a short time, or other operations of the electronic device may be restricted. Accordingly, V2P communication capable of reducing the amount of power consumed by the electronic device may be required.

SUMMARY

According to various embodiments, an electronic device and an operation method thereof, may transmit a communication signal when various conditions, which correspond to the case in which the electronic device is located close to a road, are satisfied.

An electronic device according to various embodiments may include a communication circuit including a reception circuit and a transmission circuit, and a processor, wherein the processor is configured to: receive, via the reception circuit, at least one piece of identification information corresponding to at least one external electronic device for providing a traffic-related signal to at least one vehicle outside the electronic device; identify a position of the electronic device, based at least on the at least one piece of identification information; and activate the transmission circuit to transmit movement-related information of the electronic device to the at least one vehicle or the at least one external electronic device, based at least on the position.

An electronic device according to various embodiments may include a communication circuit including a reception circuit and a transmission circuit, and a processor, wherein the processor is configured to: receive, via the reception circuit, at least one piece of traffic zone information corresponding to at least one external electronic device for providing a traffic-related signal to at least one vehicle outside the electronic device; and activate the transmission circuit to transmit movement-related information of the electronic device to the at least one vehicle or the at least one external electronic device when the position of the electronic device falls within the at least one traffic zone.

An electronic device according to various embodiments may include a communication circuit including a transmission circuit and a reception circuit and at least one processor, wherein the at least one processor is configured to: activate the reception circuit in a state in which the transmission circuit is inactivated to receive, via the reception circuit, at least one of first identification information, corresponding to at least one external electronic device for providing a traffic-related signal to a vehicle outside the electronic device, and second identification information, corresponding to the vehicle; and activate the transmission circuit in response to receiving at least one of the first identification information and the second identification information; and transmit a communication signal including at least one of information on position of the electronic device and information on movement of the electronic device.

According to various embodiments, there may be provided an electronic device and an operation method thereof, which may transmit a communication signal when various conditions, which correspond to the case in which the electronic device is located close to a road, are satisfied. Accordingly, when the electronic device is not located close to a road, the communication signal may not be transmitted, whereby the amount of power consumed by the electronic device may be reduced.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 7 is a diagram illustrating a data format of a PSM according to various embodiments;

DETAILED DESCRIPTION

Figure 1:
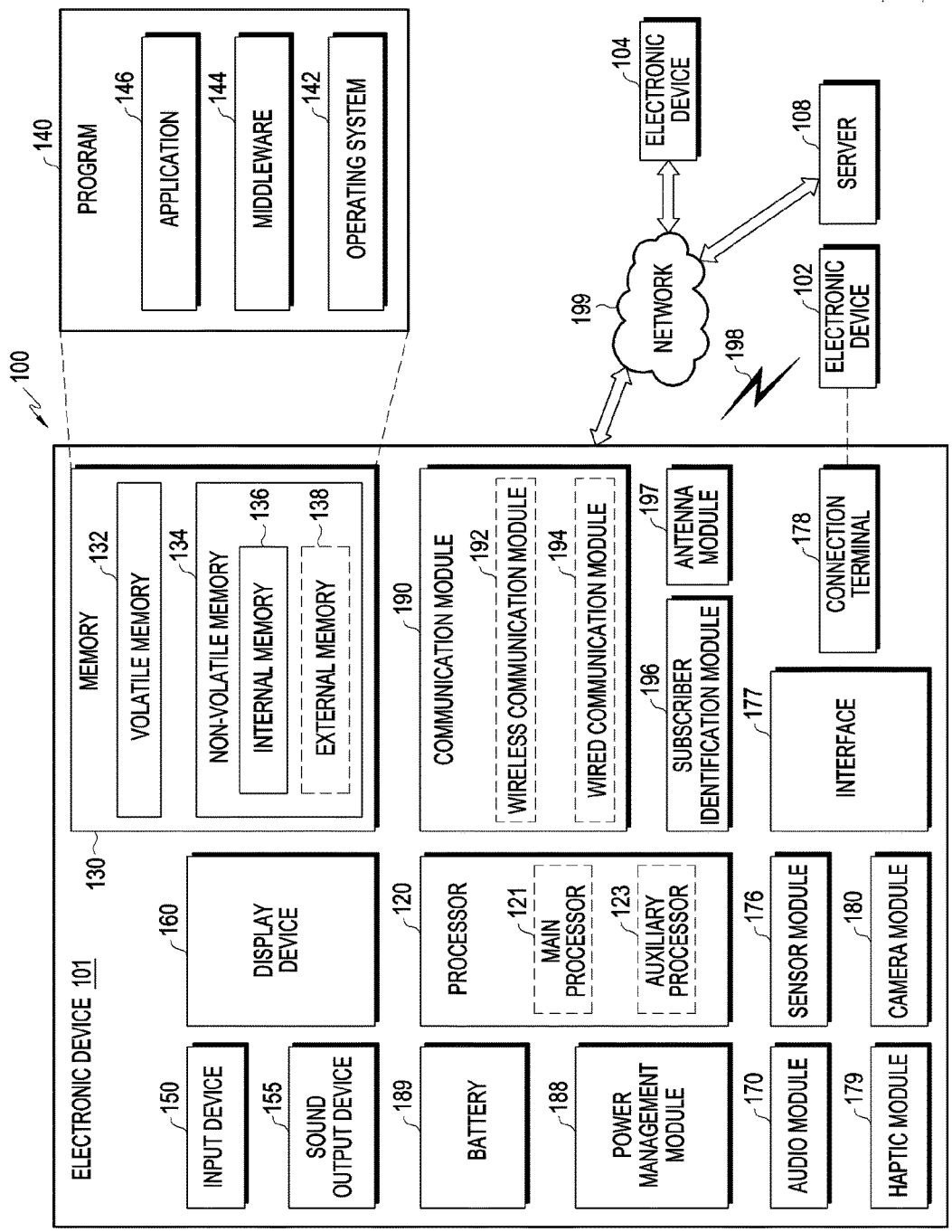
FIG. 1 is a block diagram illustrating an electronic device in a network environment according to various embodiments.

FIG. 1 is a block diagram of an electronic device 101 in a network environment 100 according to various embodiments. Referring to FIG. 1, an electronic device 101 may communicate with an electronic device 102 via a first network 198 (e.g., short-range wireless communication), or may communicate with an electronic device 104 or a server 108 via a second network 199 (e.g., long-distance wireless communication) in the network environment 100. According to an embodiment, the electronic device 101 may communicate with the electronic device 104 via a server 108. According to an embodiment, the electronic device 101 may include a processor (e.g., including processing circuitry) 120, a memory 130, an input device (e.g., including input circuitry) 150, a sound output device 155, a display device 160, an audio module (e.g., including audio circuitry) 170, a sensor module 176, an interface (e.g., including interface circuitry) 177, a haptic module (e.g., including haptic circuitry) 179, a camera module 180, a power management module 188, a battery 189, a communication module (e.g., including communication circuitry) 190, a subscriber identification module 196, and an antenna module 197. According to an embodiment, the electronic device 101 may omit at least one (e.g., the display device 160 or the camera module 180) of the elements, or may add other elements. According to an embodiment, some elements may be integrated, as in the case of a sensor module 176 (e.g., a fingerprint sensor, an iris sensor, or an illumination sensor) that is embedded in a display device 160 (e.g., a display).

The processor 120 may include various processing circuitry and drive, for example, software (e.g., the program 140) so as to control at least one other element (e.g., a hardware and/or software element) of the electronic device 101 connected to the processor 120, and may process and perform operations on various data. The processor 120 may load commands or data received from other elements (e.g., the sensor module 176 or communication module 190) into volatile memory 132, may process the loaded commands or data, and may store resultant data in nonvolatile memory 134. According to an embodiment, the processor 120 may include a main processor 121 (e.g., a central processing device or an application processor) and a sub-processor 123 (e.g., a graphic processing device, an image signal processor, a sensor-hub processor, or a communication processor), which operates independently from the main processor 121, and, additionally or alternatively, uses lower power than that of the main processor 121, or is specific to a designated function. Here, the sub-processor 123 may operate separately from the main processor 121, or may operate in the state of being embedded therein.

In this instance, the sub-processor 123 may control at least a part of the functions or states associated with at least one element (e.g., the display device 160, the sensor module 176, or the communication module 190) of the elements of the electronic device 101, on behalf of the main processor 121 while the main processor 121 is in an inactive state (e.g., a sleep state), or together with the main processor 121 while the main processor 121 is in an active state (e.g., executing an application). According to an embodiment, the sub-processor 123 (e.g., an image signal processor or a communication processor) may be implemented as a part of another element (e.g., the camera module 180 or the communication module 190) that is functionally related thereto.

The memory 130 may store various data, for example, software (e.g., the program 140), which is used by at least one element (e.g., the processor 120 or the sensor module 176) of the electronic device 101, and input data or output data associated with commands related to the at least one element. The memory 130 may include the volatile memory 132 or the nonvolatile memory 134.

The program 140 may be software stored in the memory 130, and may include, for example, the operating system 142, the middleware 144, or the application 146.

The input device 150 may be a device for receiving commands or data which are to be used for elements (e.g., the processor 120) of the electronic device 101, from the outside (e.g., a user) of the electronic device 101, and may include various input circuitry, such as, for example, and without limitation, a microphone, a mouse, and/or a keyboard, or the like.

The sound output device 155 may be a device for outputting a sound signal to the outside of the electronic device 101, and may include various sound output circuitry, such as, for example, and without limitation, a speaker which is used for general purposes, such as multimedia playback or transcription playback, and/or a receiver which is used for the purpose of receiving a phone call, or the like. According to an embodiment, the receiver may be configured to be integrated with a speaker, or may be configured separately from a speaker.

The display device 160 is a device for providing visual information to a user of the electronic device 101, and may include, for example, and without limitation, a display, a hologram device, and/or a projector, or the like, and a control circuit for controlling a corresponding device. According to an embodiment, the display device 160 may include touch circuitry or a pressure sensor for measuring the intensity of pressure of a touch.

The audio module 170 may include various audio circuitry and bidirectionally convert sound and an electrical signal. According to an embodiment, the audio module 170 may obtain sound using the input device 150, or may output sound via the sound output device 155 or an external electronic device (e.g., the electronic device 102 (e.g., a speaker or a headphone) wiredly or wirelessly connected to the electronic device 101.

The sensor module 176 may include various sensing circuitry and/or sensors to generate an electrical signal or data value corresponding to an internal operation state (e.g., power or temperature) of the electronic device 101 or an external environment state. The sensor module 176 may include various sensors/sensing circuitry, such as, for example, and without limitation, a gesture sensor, a gyro sensor, an atmospheric pressure sensor, a magnetic sensor, an acceleration sensor, a grip sensor, a proximity sensor, a color sensor, an Infrared (IR) sensor, a biometric sensor, a temperature sensor, a humidity sensor, and/or an illumination sensor, or the like.

The interface 177 may support a designated protocol that is wiredly or wirelessly connectable to an external electronic device (e.g., the electronic device 102). According to an embodiment, the interface 177 may include various interface circuitry, such as, for example, and without limitation, a High-Definition Multimedia Interface (HDMI), a Universal Serial Bus (USB) interface, an SD card interface, and/or an audio interface, or the like.

A connection terminal 178 may include a connector that is capable of physically connecting the electronic device 101 and an external electronic device (e.g., the electronic device 102), for example, a HDMI connector, a USB connector, an SD card connector, or an audio connector (e.g., a headphone connector).

A haptic module 179 may convert an electrical signal into a mechanical stimulus (e.g., vibration or movement) or an electrical stimulus that a user can recognize via a sense of touch or movement. The haptic module 179 may include various haptic circuitry, such as, for example, and without limitation, a motor, a piezoelectric effect element, and/or an electrostimulator, or the like.

The camera module 180 may shoot a still image and a video. According to an embodiment, the camera module 180 may include one or more lens, an image sensor, an image signal processor, or a flash.

The power management module 188 may be a module for managing power supplied to the electronic device 101, and may be configured as, for example, at least a part of a Power Management Integrated Circuit (PMIC).

The battery 189 is a device for supplying power to at least one element of the electronic device 101, and may include, for example, a primary cell that is not rechargeable, a secondary cell that is rechargeable, or a fuel cell.

The communication module 190 may include various communication circuitry to establish a wired or wireless communication channel between the electronic device 101 and an external electronic device (e.g., the electronic device 102, the electronic device 104, or the server 108), and may support communication via the established communication channel. The communication module 190 may include one or more communication processors which operate independently from the processor 120 (e.g., an application processor), and may support wired or wireless communication. According to an embodiment, the communication module 190 may include a wireless communication module 192 (e.g., a cellular communication module, a short-range wireless communication module, or a Global Navigation Satellite System (GNSS) communication module) or a wired communication module 194 (e.g., a Local Area Network (LAN) communication module or a power line communication module), and may communicate with an external electronic device via a first network 198 (e.g., a short-range communication network such as Bluetooth, Wi-Fi direct, or Infrared Data Association (IrDA)) or a second network 199 (e.g., a long-distance communication network such as a cellular network, the Internet, or a computer network (e.g., LAN or WAN)) using a corresponding communication module among the described communication modules. The above-described various types of communication module 190 may be implemented as a single chip or implemented as separate chips.

According to an embodiment, the wireless communication module 192 may identify and authenticate the electronic device 101 within a communication network using user information stored in the subscriber identification module 196.

The antenna module 197 may include one or more antennas for transmitting or receiving signals or power to/from the outside. According to an embodiment, the communication module 190 (e.g., the wireless communication module 192) may transmit a signal to an external electronic device, or may receive a signal from an external electronic device, via an antenna appropriate for a communication scheme.

Some of the elements may be connected to each other via a communication scheme of neighboring devices (e.g., a bus, a General Purpose Input/Output (GPIO), a Serial Peripheral Interface (SPI), or a Mobile Industry Processor Interface (MIPI)), and may mutually exchange signals (e.g., commands or data).

According to an embodiment, commands or data may be transmitted or received between the electronic device 101 and an external electronic device 104 via the server 108 connected to the second network 199. Each electronic device 102 and 104 may be of a type the same as or different from the electronic device 101. According to an embodiment, some or all of the operations executed by the electronic device 101 may be executed by another external electronic device or multiple external electronic devices. According to an embodiment, when the electronic device 101 has to perform some functions or services automatically or by request, the electronic device 101 may request an external electronic device to perform at least some functions relating thereto instead of, or in addition to, performing the functions or services by itself. The external electronic device that receives the request may execute the requested function or an additional function, and may transmit the result thereof to the electronic device 101. The electronic device 101 may provide the received result as it is, or may additionally process the received result to provide the requested functions or services. To this end, for example, cloud-computing, distributed-computing, or client-server-computing may be used.

Figure 2:
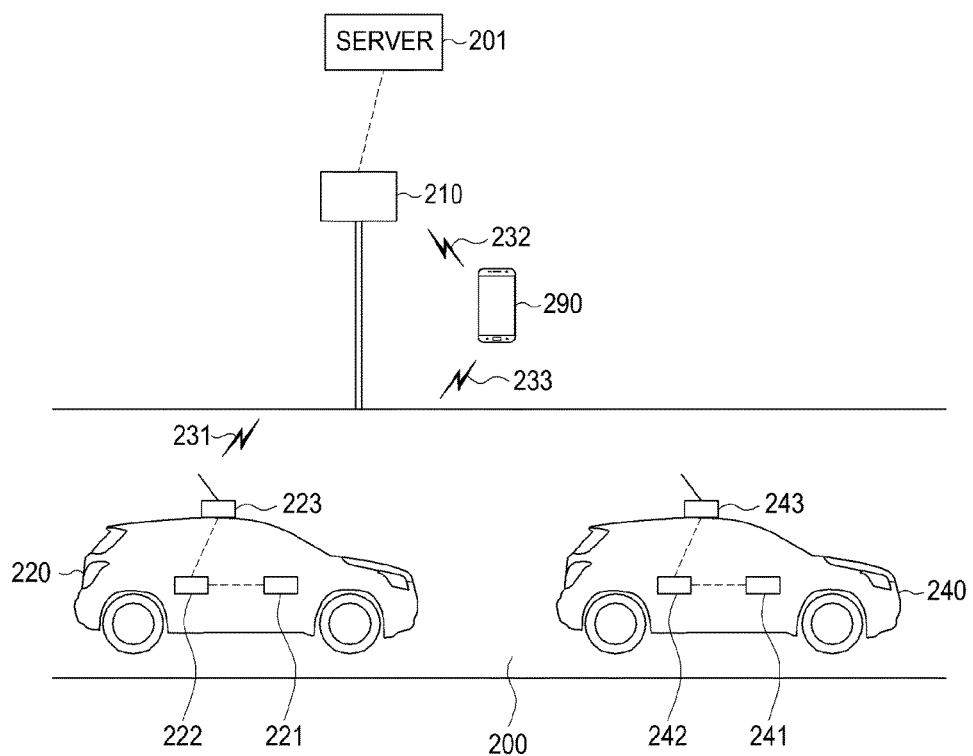
FIG. 2 is a diagram illustrating an electronic device, a vehicle, and a roadside unit according to various embodiments.

FIG. 2 is a diagram illustrating a mobile terminal device, a vehicle, and a Roadside Unit (RSU) according to various embodiments.

As illustrated in FIG. 2, at least one vehicle 220 or 240 may be located on a road 200. A Roadside Unit (RSU) 210 may be located around (proximate) the road 200. The vehicle 220 may include a terminal platform 221, a vehicle communication module (e.g., including communication circuitry) 222, and an antenna 223, and the vehicle 240 may include a terminal platform 241, a vehicle communication module (e.g., including communication circuitry) 242, and an antenna 243. The vehicle 220 may include, for example, at least a part of the electronic device 101 of FIG. 1. In this instance, the terminal platform 221 may include, for example, the processor 120. The vehicle communication module 222 may include, for example, the communication module 190. Accordingly, the fact that the vehicle 220 performs a predetermined operation may indicate that the electronic device 101 (e.g., the processor 120) performs the predetermined operation. Alternatively, the fact may indicate that another piece of hardware is configured to perform the predetermined operation according to the control of the processor 120. Alternatively, the fact may indicate that an instruction that enables the processor 120 to perform the predetermined operation is stored in the memory 130. The terminal platform 221 and 241 may control various operations of the vehicle 220 and 240, and may obtain various information related to the vehicle 220 and 240. For example, the vehicle 220 and 240 may receive measurement data from various sensors, such as a speedometer (not illustrated), an acceleration meter (not illustrated), a direction meter (not illustrated), a brake detector (not illustrated), a position measurement device (e.g., GPS module) (not illustrated), or a road-surface state detector (not illustrated), or the like. The vehicle 220 and 240 (e.g., the terminal platform 221 and 241) may generate transmission data based on received measurement data. Alternatively, the terminal platform 221 and 241 may generate transmission data, based on information included in the memory (not illustrated) in the vehicle 220 and 240, the information including identification information of the vehicle 220 and 240, the size of the vehicle 220 and 240, or capability-related information of the vehicle 220 and 240. For example, the vehicle communication module 222 may generate a signal corresponding to a communication signal using transmission data, and may provide the same to the antenna 223. The antenna 223 may transmit a communication signal 231 to a neighboring entity (e.g., the RSU 210, a mobile terminal device 290, or another vehicle 240) using a received signal. The communication signal 231 may include various information, such as the speed of the vehicle 220, the acceleration, the heading direction, whether a brake is operating, the location, roadside detection information, or the like. For example, the vehicle 220 may transmit the communication signal 231 defined in a Wireless Access in Vehicular Environment (WAVE) scheme, and may use a frequency band having a central frequency of 5.8 GHz. For example, the vehicle 220 may include a Basic Safety Message (BSM) defined in a predetermined Society of Automotive Engineers (SAE) standard (e.g., document J2735) that defines a message set, a data frame, and a data element associated with an application for implementing the WAVE scheme, in the communication signal 231, and may transmit the same. In the BSM, the position information of the vehicle 220 (e.g., a latitude, a longitude, an altitude, or location accuracy), movement information (e.g., speed, heading, steering wheel angle), an acceleration set, control information (e.g., a brake state), or basic information (e.g., part 1 information) of a vehicle (e.g., the size of a vehicle) may be included, and additional information (e.g., part 2 information) may be further included depending on the case. The type of information included in the BSM is merely an example, and may be changed as standards change. The vehicle 220 according to various embodiments may transmit the communication signal 231 that includes information of a type the same as the information type defined in the BSM, or may transmit the communication signal 231 including information of a type that is at least partially different from the information type defined in the BSM.

The vehicle 220 is capable of transmitting the communication signal 231, based on a transmission interval, a frequency, or a strength defined in the related standard. However, this is merely an example, and those skilled in the art may readily understand that a transmission condition (e.g., a transmission interval, a transmission frequency, or a transmission strength) used for transmitting the communication signal 231 by the vehicle 220 is not limited.

Normally, the vehicle 220 is capable of transmitting the communication signal 231 that includes the BSM. However, the vehicle 220 may transmit the communication signal 231 including various types of messages therein, for example, a Common Safety Request (CSR), an Emergency Vehicle Alert (EVA), or Intersection Collision Avoidance (ICA), or the like, according to various conditions. The communication signal 231 that the antenna 223 transmits may include a Contextual Awareness Message (CAM) according to the standard applied to the vehicle 220. The vehicle 220 may broadcast, unicast, or multi-cast the communication signal 231 to another vehicle 240, the RSU 210, or the mobile terminal device 290 via the antenna 223. At least one of the terminal platform 221, the vehicle communication module 222, and the antenna 223 included in the vehicle 220 may be referred to as an onboard unit (OBU).

The RSU 210 may receive the communication signal 231 from the vehicle 220, and may obtain information from the received communication signal 231. The RSU 210 may be located around the road 200, and may be disposed at a point where the safety of a pedestrian needs to be secured, such as a crosswalk, a traffic light, or a crossroad, or the like, or on a point where the probability of an accident of the vehicle 220 is relatively high. Alternatively, the RSU 210 may be disposed such that a shadow region does not exist. The RSU 210 may broadcast a communication signal 232 including at least one of received information and a result of analysis of the received information therein, or may transmit at least one of the received information and the result of analysis of the received information to the server 201. The server 201 may manage the RSU 210, collect vehicle information, collect traffic information, provide traffic image information, or the like. The RSU 210 may determine various situations (e.g., an accident, vehicle breakdown, dangerous situations for a vehicle or a pedestrian), based on information received from the vehicle 220, and may transmit the communication signal 232 including information on the various situations to a vehicle (e.g., the vehicle 220, another vehicle 240, or the mobile terminal device 290). The RSU 210 may broadcast, unit-cast, or multi-cast, to a neighboring entity, the communication signal 232 including at least one of the identification information of the RSU 210, the position information of the RSU 210, information associated with a neighboring vehicle, and information associated with a neighboring pedestrian. The RSU 210 may transmit alert information or the like depending on the situation. The RSU 210 may control a landmark (e.g., a traffic light) located in a traffic zone according to received information.

A pedestrian carrying the mobile terminal device 290 may be located around the road 200. The mobile terminal device 290 may be an electronic device that may be carried by a pedestrian, and may include, for example, at least a part of the electronic device 101 of FIG. 1. Accordingly, the fact that the mobile terminal device 290 performs a predetermined operation may indicate that the electronic device 101 (e.g., the processor 120) performs the predetermined operation. Alternatively, the fact may indicate that another piece of hardware is configured to perform the predetermined operation according to the control of the processor 120. Alternatively, the fact may indicate that an instruction that enables the processor 120 to perform the predetermined operation is stored in the memory 130. The mobile terminal device 290 may transmit a communication signal 233 including information obtained by the mobile terminal device 290 to the vehicle 220 or 240 or the RSU 210, wherein the obtained information may be a position, a speed, heading, an acceleration, path history information, information associated with whether a pedestrian is on board, pedestrian behavior information, crosswalk crossing information, information associated with the size of a pedestrian cluster, construction-work-related information, obstacle-related information, pedestrian-related information, information associated with an entity carried by a pedestrian, or the like. The mobile terminal device 290 may generate the communications signal 233 using information obtained by various sensors (e.g., the sensor module 276) included therein, information obtained via the input device 150, information obtained via a touch circuit included in the display device 160, or information obtained via the communication module 190. For example, the mobile terminal device 290 may transmit a communication signal 233 including a Personal Safety Message (PSM) as defined in the Society of Automotive Engineers (SAE) standard (e.g., document J2735). The information included in the PSM will be described in detail with reference to FIG. 7. The type of information included in the PSM is merely an example, and may be changed as standards change. Those skilled in the art may easily understand that the present embodiment is not limited by the type of information of the PSM. The mobile terminal device 290 is capable of transmitting the communication signal 233, based on a transmission interval, a frequency, or a strength defined in the related standard. However, this is merely an example, and those skilled in the art may easily understand that a transmission condition (e.g., a transmission interval, a transmission frequency, or a transmission strength) used for transmitting the communication signal 233 by the mobile terminal device 290 is not limited. The mobile terminal device 290 may broadcast, unit-cast, or multi-cast the communication signal 233 to the vehicle 220 or 240 or the RSU 210.

According to various embodiments, the mobile terminal device 290 may be configured to transmit the communication signal 233 when a designated condition is satisfied. That is, when the designated condition is not satisfied, the mobile terminal device 290 may not transmit the communication signal 233, whereby the amount of battery charge that is consumed may be reduced. For example, the mobile terminal device 290 may receive the communication signal 232 from the RSU 210, and when the communication signal analysis result shows that the identification information of the RSU 210 is detected, the mobile terminal device 290 may start transmission of the communications signal 233 in response thereto. Alternatively, when it is determined that the mobile terminal device 290 is located in a designated area by referring to map data stored in advance, the mobile terminal device 290 may start transmission of the communication signal 233 in response thereto. The mobile terminal device 290 may determine the transmission condition used for transmitting the communication signal 233 according to whether a condition is satisfied, whereby the amount of battery charge consumed by the mobile terminal device 290 may be reduced. According to various conditions, the mobile terminal device 290 may determine whether to transmit the communication signal 233, may determine a transmission condition used for transmitting the communication signal 233, or may activate or inactivate at least a part of the communication module 190.

Figure 3A:
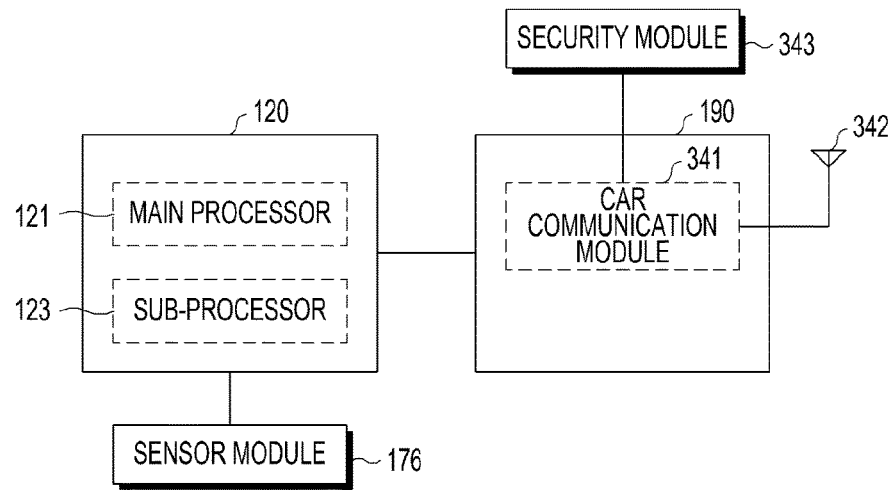
FIGS. 3A, 3B and 3C are block diagrams illustrating an electronic device according to various embodiments.
Figure 3B:
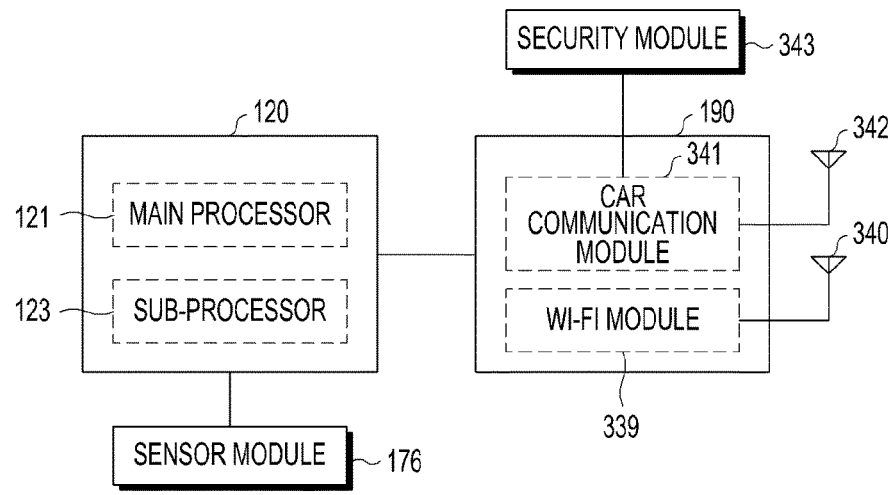
Figure 3C:
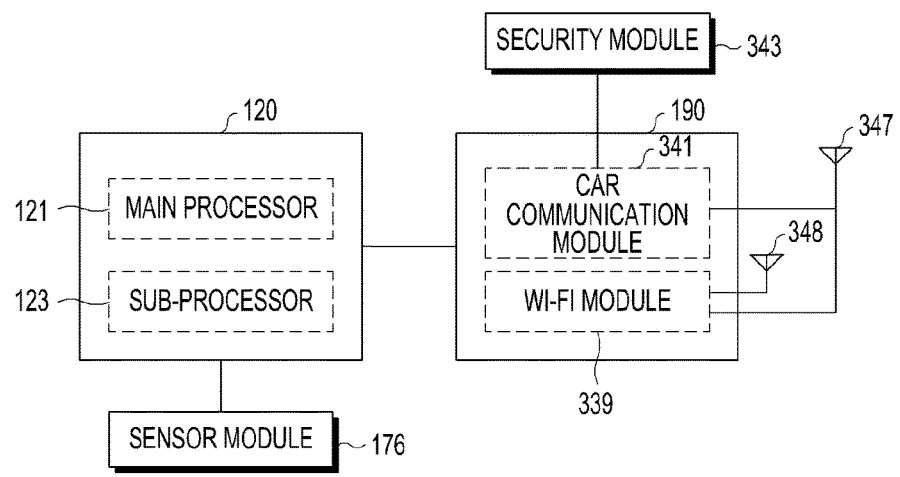

FIGS. 3A, 3B and 3C are block diagrams illustrating an electronic device according to various embodiments.

Referring to FIG. 3A, the communication module 190 may include a car communication module (e.g., including communication circuitry) 341, and the car communication module 341 may be connected to a car communication module antenna 342. The car communication module antenna 342 may be included in, for example, the antenna module 197. The electronic device 101 may include a security module 343. As described above, the electronic device 101 may be included in the vehicle 220 and 240 or the mobile terminal device 290. The processor 120 (e.g., the main processor 121) may control the overall operation of the electronic device 101. For example, at least one piece of hardware may be controlled to perform an operation corresponding to an instruction stored in the memory 130 as the instruction is executed. The main processor 121 (e.g., an Application Processor (AP)) may be in one of a sleep state and a wake-up state. When the main processor 121 is in the sleep state, the main processor 121 may not perform any operation, whereby the amount of charge in the battery consumed by the main processor 121 may be reduced. The main processor 121 may switch the state to the wake-up state according to various conditions as a trigger, and the main processor 121 in the wake-up state may operate according to an instruction stored in the memory 130. The main processor 121 may provide information associated with driving another vehicle, based on information included in a communication signal received via the communication module 190. The main processor 121 may store information associated with driving of a vehicle in the memory 130 for each piece of identification information. The main processor 121 may obtain various information, such as data obtained by various sensors included in the sensor module 176 (e.g., an acceleration sensor, a gyro sensor, a geomagnetic field sensor, or the like), data from a position measurement device (e.g., a GPS module or the like), analysis results of images obtained by the camera module 180, or the like. The main processor 121 may control the car communication module 341 and the car communication module antenna 342 such that a communication signal including the obtained information is transmitted. Although not illustrated, a Front End Module (FEM) may be connected to the car communication module 341 and to the car communication module antenna 342. When the main processor 121 is in the sleep state, the above-described operations of the main processor 121 may be performed by the sub-processor 123 (e.g., the sensor-hub processor). The main processor 121 or the sub-processor 123 may perform control such that a communication signal is transmitted when a designated condition is satisfied, and may perform control such that a communication signal is not transmitted when a designated condition is not satisfied.

The car communication module 341 may support a WAVE communication scheme, and may transmit a communication signal including, for example, a PSM or a BSM, via the car communication module antenna 342. According to various embodiments, the electronic device 101 may be carried on a vehicle, or the electronic device 101 may be electrically connected to a vehicle. In this instance, the car communication module 341 may transmit a communication signal including a BSM via the car communication module antenna 342. Alternatively, the car communication module 341 may receive a communication signal including a BSM or PSM from another entity, and may provide the communication signal to the processor 120. Alternatively, the car communication module 341 may process a communication signal received from the outside (e.g., a communication signal including a BSM received from a vehicle) via the car communication module antenna 342, and may transmit the processed communication signal to the processor 120.

According to various embodiments, the car communication module 341 may be implemented as a chipset capable of performing various kinds of communication, such as Wi-Fi communication, Bluetooth communication, or the like, in addition to WAVE communication. For example, the car communication module 341 may be implemented as a chipset capable of processing both Wi-Fi data and data associated with car safety (e.g., WAVE data). For example, the car communication module 341 may be implemented as a chipset manufactured to process data according to IEEE 802.11 a/b/n/p. In addition, the car communication module antenna 342 may transmit and receive a Wi-Fi communication signal, and may transmit and receive a communication signal associated with car safety (e.g., a WAVE communication signal). For example, the Wi-Fi communication signal may use a frequency band having a central frequency of 5 GHz. The WAVE communication signal may use a frequency band having a central frequency of 5.8 GHz, which has a relatively small difference from the frequency for Wi-Fi. Accordingly, the car communication module antenna 342 may transmit and receive the two communication signals. Although the car communication module antenna 342 is illustrated as a single antenna, this is merely an example. The car communication module antenna 342 may be configured as multiple antennas according to the requirements of the communication standard. When the car communication module 341 supports multiple communication schemes, the car communication module 341 may be connected to the antenna 342 that corresponds to a corresponding one of the multiple communication schemes. Alternatively, communication schemes which use similar frequencies (e.g., Wi-Fi communication of a 5 GHz band and WAVE communication of a 5.8 GHz band) from among the multiple communication schemes may share an antenna. The security module 343 may store information required for processing WAVE data, and the car communication module 341 or the processor 120 may process the WAVE data using the stored information. For example, the security module 343 may store various information, such as information used for WAVE modulation/demodulation, information used for encryption/decryption, information used for processing a message, or the like. The car communication module 341 or the processor 120 may directly access the security module 343. The security module 343 may be implemented to be integrated with the memory 130 or to be different hardware units, according to implementation. Alternatively, the security module 343 may be included in the communication module 190 or the car communication module 341 depending on the implementation. The car communication module 341 may receive data from the main processor 121 or the sub-processor 123, may process the received data so as to generate a signal corresponding to a WAVE communication signal, and may provide the generated signal to the car communication module antenna 342. For example, when the main processor 121 is in a wake-up state, the car communication module 341 may receive data from at least one of the main processor 121 and the sub-processor 123. When the main processor 121 is in a sleep state, the car communication module 341 may receive data from the sub-processor 123. The sub-processor 123 may include at least one of a processing circuit and a storage circuit, wherein the processing circuit is capable of obtaining data from at least one of sensors (e.g., an acceleration sensor, a gyro sensor, or a geomagnetic field sensor) and a GPS module and processing the obtained data, and the storage circuit is capable of temporarily or permanently storing the data. The car communication module 341 may include at least one of a processing circuit for processing a WAVE communication signal, a transmission circuit for transmitting a communication signal, and a reception circuit for receiving a communication signal. The car communication module 341 may perform scanning for receiving a communication signal at designated intervals, may analyze the communication signal, and may be capable of operating even when the processor 121 is in the sleep state. When the car communication module 341 receives a communication signal, and data included in the communication signal satisfies a designated condition, the car communication module 341 may wake up the main processor 121.

In the case of normal Wi-Fi operation when the main processor 121 is in the sleep state, if a communication signal is received from an access point to which a connection has been established at least one time or that satisfies a designated condition, the main processor 121 may enter the wake-up state. The information associated with the access point that satisfies the designated condition or that has connected at least one time may be updated. When updating is needed, the information associated with the storage of the communication module 190 may be changed by the main processor 121, and the communication module 190 may operate according to the changed information. The car communication module 341 may include a transmission circuit for transmitting a communication signal and a reception circuit for processing a communication signal from another electronic device. The electronic device 101 may selectively activate the transmission circuit or the reception circuit. For example, the electronic device 101 may inactivate the transmission circuit and may activate the reception circuit, thereby scanning a communication signal from another entity without transmitting a communication signal. In the present disclosure, a module for performing communication may be referred to as a communication circuit. The electronic device 101 may determine the activation/inactivation state of at least one of the transmission circuit and the reception circuit, based on the detection of various conditions.

When a communication signal (e.g., the communication signal 232) is received from an RSU (e.g., the RSU 210), the processor 120 may activate the transmission circuit of the communication module 190 in response to the reception, and may perform control such that a communication signal (e.g., a communication signal including a PSM) including obtained data is transmitted via the activated transmission circuit. Alternatively, the processor 120 may perform control such that a communication signal is transmitted using at least some of map data associated with a predetermined region. For example, when the electronic device 101 enters a predetermined region, the electronic device 101 may receive map data associated with the predetermined region via an RSU (e.g., the RSU 210) or a server (not illustrated), and may store the same in the memory 130. The map data according to various embodiments may be data expressed as at least one value of a previously designated latitude, longitude, and altitude, or may be data in the form of an image. When it is determined that the position information of the electronic device 101 identified by a GPS module (not illustrated) falls within a previously designated location, the processor 120 may control the communication module 190 such that a communication signal is transmitted. When the main processor 121 is in the sleep state, the sub-processor 123 may receive and store at least a part of map data associated with the predetermined region from the memory 130, and may compare the stored map data with the position of the electronic device 101 identified by the GPS module (not illustrated). The sub-processor 123 may determine whether to transmit a communication signal based on the comparison result.

The display device 160 may display various graphic objects (e.g., a Graphic User Interface (GUI)) associated with car safety. According to various embodiments, the display device 160 may display a graphic object capable of activating the transmission or reception of a WAVE communication signal, and the main processor 121 may control the transmission and reception of the WAVE communication signal according to user input. The audio module 170 may output a car-related warning sound or the like. The camera module 180 may obtain an image, and the main processor 121 may determine whether to activate transmission or reception of a WAVE communication signal using the image received from the camera module 180. An acceleration sensor (not illustrated) may sense the acceleration of the electronic device 101, a gyro sensor (not illustrated) may sense rotation information, and a geomagnetic field sensor (not illustrated) may sense geomagnetic field information. The processor 120 may include information in a communication signal (e.g., a communication signal including a PSM) to be transmitted via the car communication module 341 using data obtained from various sensors (e.g., an acceleration sensor (not illustrated), a gyro sensor (not illustrated), or geomagnetic field sensor (not illustrated)) or a GPS module (not illustrated). According to various embodiments, the electronic device 101 may not include the sub-processor 123. In this instance, the main processor 121 may always be in the wake-up state, or may periodically enter the wake-up state so as to determine whether to transmit a communication signal.

FIG. 3B is a block diagram illustrating an electronic device according to various embodiments. The communication module 190 according to an embodiment of FIG. 3B may further include a Wi-Fi module (e.g., including Wi-Fi circuitry) 339 when compared to the embodiment of FIG. 3A. The Wi-Fi module 339 may be implemented as a chipset capable of performing Wi-Fi communication, and the car communication module 341 may be separately implemented as, for example, a chipset for performing WAVE communication. A Wi-Fi communication signal may be transmitted and received via a Wi-Fi antenna 340 which is connected to the Wi-Fi module 339. For example, a Wi-Fi communication signal (e.g., a communication signal including a PSM or a communication signal including a BSM) may be transmitted and received via the car communication module antenna 342 connected to the car communication module 341. According to various embodiments, the car communication module 341 and the Wi-Fi module 339 may be connected to antennas 340 and 341, respectively, as shown in FIG. 3B. However, according to another embodiment, the car communication module 341 and the Wi-Fi module 339 may share an antenna.

FIG. 3C is a block diagram illustrating an electronic device according to various embodiments. The Wi-Fi module 339 and the car communication module 341 of the electronic device 101 according to the embodiment of FIG. 3C may share a first antenna 347, and the Wi-Fi module 339 may be connected to a second antenna 348. When the Wi-Fi module 339 performs first Wi-Fi communication in a 2.4 GHz band and second Wi-Fi communication in a 5 GHz band, the circuit for the second Wi-Fi communication of the Wi-Fi module 339 may share the first antenna 347 with a WAVE communication module. In this instance, the circuit for the first Wi-Fi communication of the Wi-Fi module 339 may be connected to the second antenna 348 (e.g., an antenna for processing a 2.4 GHz band).

Figure 4:
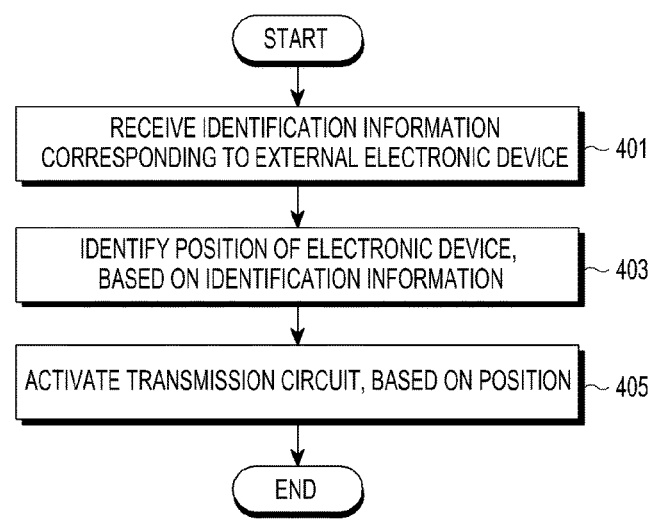
FIG. 4 is a flowchart illustrating a method of operating an electronic device according to various embodiments.

FIG. 4 is a flowchart illustrating a method of operating an electronic device according to various embodiments.

In operation 401, the electronic device 101 may receive at least one piece of identification information corresponding to at least one external electronic device (e.g., the RSU 210) for providing a traffic-related signal to at least one vehicle (e.g., the vehicle 220) outside the electronic device 101 via a reception circuit. In the present disclosure, the fact that the electronic device 101 performs a predetermined operation may indicate that the processor 120 included in the electronic device 101 performs the predetermined operation, or controls another piece of hardware to perform the predetermined operation. Alternatively, the fact that the electronic device 101 performs a predetermined operation may indicate that the processor 120 performs the predetermined operation or controls another piece of hardware to perform the predetermined operation as an instruction stored in the memory 130 included in the electronic device 101 (or the memory included in the sub-processor 123) executes. For example, the electronic device 101 may receive a communication signal from at least one external electronic device, and may detect an external electronic device located close to a road, based on identification information included in the communication signal.

In operation 403, the electronic device 101 may identify the position of the electronic device 101, based at least on the at least one piece of identification information. For example, the electronic device 101 may determine that the electronic device 101 is located close to a road, that is, a traffic zone, based at least on the identification information of the external electronic device (e.g., the RSU 210). The traffic zone may be an area where the electronic device 101 needs to transmit a communication signal, and may be an area designated in advance according to various conditions. The electronic device 101 may identify the device type of the at least one electronic device, based at least on identification information, and when the device type of the external electronic device is an RSU, the electronic device 101 may determine that the electronic device 101 is located in the traffic zone.

In operation 405, the electronic device 101 may activate a transmission circuit to transmit movement-related information of the electronic device 101 to at least one vehicle or at least one external electronic device, based at least one the determined position. As at least a part of the movement-related information, a PSM may be included. The electronic device 101 may transmit a communication signal, including movement-related information received via various sensors, via the activated transmission circuit.

Alternatively, the electronic device 101 may compare the current position of the electronic device 101 and information associated with a road area included in the received communication signal together with the identification information, and when the comparison result shows that the electronic device 101 is located close to the road, the electronic device 101 may activate the transmission circuit for transmitting a communication signal.

According to various embodiments, the electronic device 101 may identify the distance to the external electronic device, and may control a reception interval for receiving a communication signal including identification information, based at least on the distance. According to various embodiments, the electronic device 101 may determine whether a signal is received, which is associated with position information identified by a position measurement module (e.g., a GPS module), and when the signal is received, the electronic device 101 may activate the reception circuit and may receive a communication single including identification information.

According to what has been described above, the electronic device 101 may activate the transmission circuit when the electronic device 101 is actually located close to a road. In other cases, the electronic device 101 may inactivate (deactivate) the transmission circuit, whereby the amount of power consumed by the electronic device 101 may be reduced. According to various embodiments, when the electronic device 101 transmits a communication signal, the electronic device 101 may inactivate the reception circuit. In this instance, the electronic device 101 may interrupt scanning of a communication signal from another entity, and may perform only transmission of a communication signal. When a designated transmission interruption condition is detected, the electronic device 101 may interrupt the transmission of a communication signal. For example, the transmission of a communication signal may be interrupted based on whether the electronic device 101 moves a distance greater than or equal to a designated value or whether the current position of the electronic device 101 falls within a designated area. The electronic device 101 may resume scanning of a communication signal after the interruption of communication signal transmission.

Figure 5:
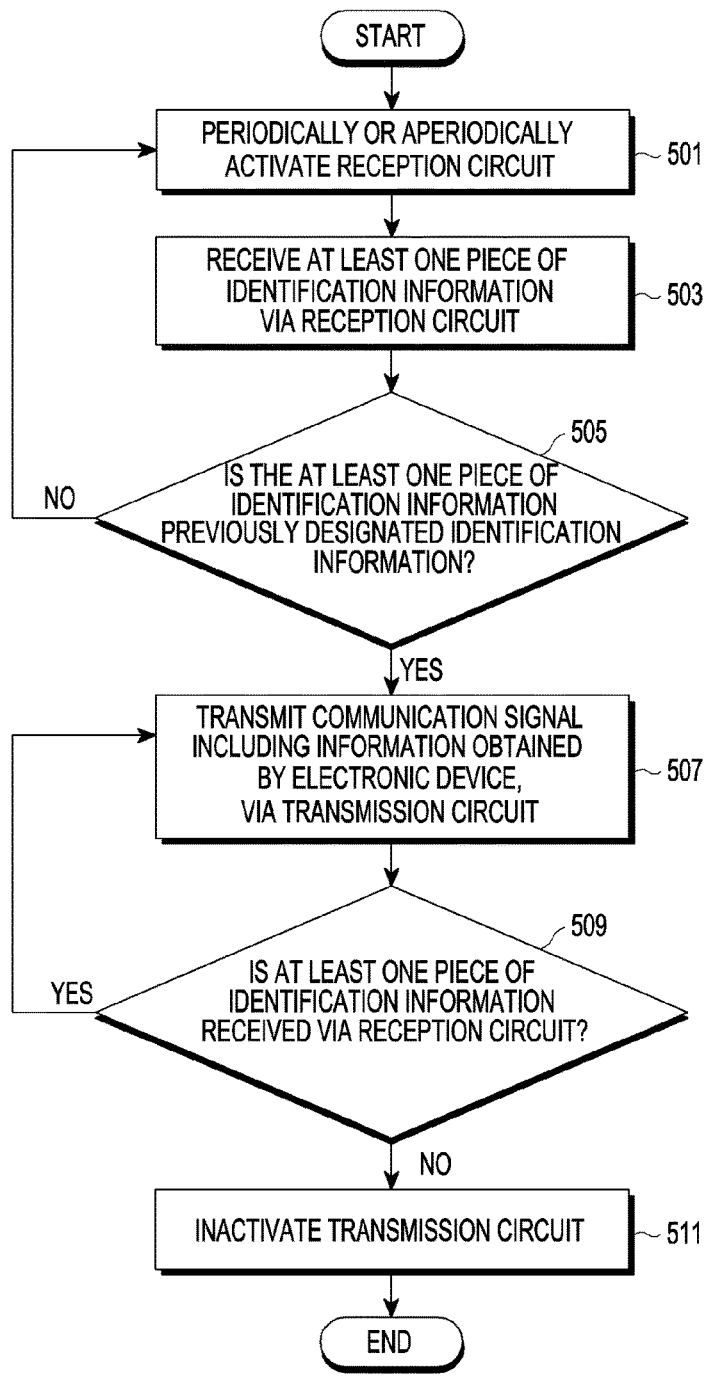
FIG. 5 is a flowchart illustrating a method of operating an electronic device according to various embodiments.
Figure 6:
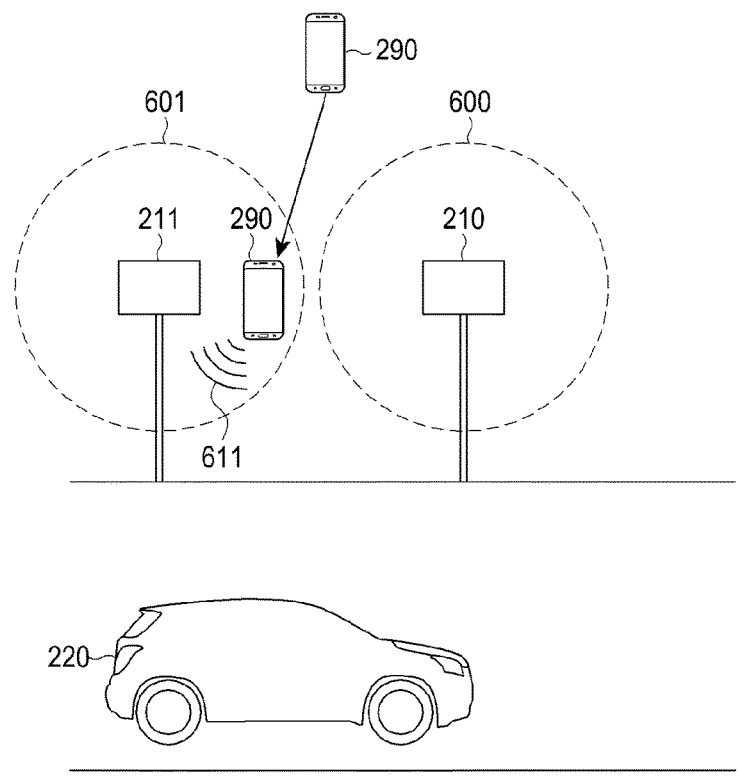
FIG. 6 is a diagram illustrating an electronic device, a roadside unit, and a vehicle according to various embodiments.

FIG. 5 is a flowchart illustrating a method of operating an electronic device according to various embodiments. The embodiment of FIG. 5 will be described in greater detail below with reference to FIG. 6. FIG. 6 is a diagram illustrating an electronic device, an RSU, and a vehicle according to various embodiments.

In operation 501, the electronic device 101 according to various embodiments may periodically or aperiodically activate a reception circuit. The electronic device 101 may activate the reception circuit at previously designated intervals, or may activate the reception circuit in response to detecting that a previously designated condition is satisfied. Alternatively, the electronic device 101 may continuously activate the reception circuit. For example, when it is identified that the electronic device 101 is located outdoors, or that a condition is satisfied, like the case in which the degree of movement of the electronic device 101 exceeds a previously designated value, or the like, the electronic device 101 may activate the reception circuit, and may scan a communication signal. In this instance, the electronic device 101 may inactivate a transmission circuit of a communication module.

In operation 503, the electronic device 101 (e.g., the mobile terminal device 290) may receive at least one piece of identification information via the reception circuit. For example, as illustrated in FIG. 6, an external electronic device, such as a Roadside Unit (RSU) (e.g., the first RSU 210 or the second RSU 211), may broadcast a communication signal including identification information at designated intervals. The first RSU 210 may have a first communication range 600, and the second RSU 211 may have a second communication range 601. Here, the communication range may indicate a range where the strength of a communication signal transmitted by an entity is greater than or equal to a previously designated threshold value. For example, the communication signal broadcasted by the first RSU 210 may be attenuated as the communication signal spreads over space, whereby the strength of the communication signal may be reduced as the distance to the first RSU 210 increases. The first communication range 600 may be a range within which the electronic device 101 is capable of detecting a communication signal transmitted from the first RSU 210.

When a user who carries the electronic device 101 (e.g., the mobile terminal device 290) moves close to an external electronic device, such as the second RSU 211, the electronic device 101 (e.g., the mobile terminal device 290) may receive a communication single including at least one piece of identification information via the reception circuit. The electronic device 101 (e.g., the mobile terminal device 290) may identify the identification information from the communication signal.

In operation 505, the electronic device 101 (e.g., the mobile terminal device 290) may determine whether the at least one piece of identification information is previously designated identification information. The previously designated identification information may be, for example, identification information indicating an RSU (e.g., the second RSU 211). Generally, an RSU is located close to a road, and thus, the fact that a user is located close to an RSU may indicate that the user is located close to a road. Accordingly, the electronic device 101 (e.g., the mobile terminal device 290) may be configured to transmit a communication signal including information obtained by the electronic device (e.g., a communication signal including a PSM) when identification information corresponding to an RSU is identified.

When the identification information is previously designated identification information, the electronic device 101 (e.g., the mobile terminal device 290) may transmit a communication signal 611 including information obtained by the electronic device 101 (e.g., the mobile terminal device 290) via the transmission circuit in operation 507. The RSU (e.g., the first RSU 210 or the second RSU 211) may transmit, to the neighboring vehicle 220, information (e.g., the movement information of the electronic device 101, the position information of the electronic device 101, or the like) associated with the electronic device 101 (e.g., the mobile terminal device 290) included in the communication signal 611 received from the electronic device 101 (e.g., the mobile terminal device 290). The vehicle 220 may control running, based on the information associated with the electronic device 101 (e.g., the mobile terminal device 290), such that the electronic device 101 (e.g., the mobile terminal device 290) is protected. For example, when information indicating that the electronic device 101 (e.g., the mobile terminal device 290) is entering the road 200 at a relatively fast speed is included in the communication signal 611, the vehicle 220 may reduce its speed or stop in order to protect the electronic device 101 (e.g., the mobile terminal device 290). Even when the electronic device 101 (e.g., the mobile terminal device 290) stops near the road 200, the vehicle 220 may perform driving for protecting the electronic device 101, such as low-speed running or the like.

In operation 509, the electronic device 101 (e.g., the mobile terminal device 290) may determine whether at least one piece of identification information is received via the reception circuit. When the previously designated identification information is continuously received, the electronic device 101 (e.g., the mobile terminal device 290) may maintain the transmission of a communication signal. When the previously designated identification information is not received, the electronic device 101 (e.g., the mobile terminal device 290) may inactivate the transmission circuit and may not transmit a communication signal in operation 511. The electronic device 101 (e.g., the mobile terminal device 290) may periodically or aperiodically activate the reception circuit, or may continuously activate the reception circuit.

FIG. 7 is a diagram illustrating the data format of a PSM according to various embodiments.

"Basic type" 701 may, for example, and without limitation, include at least one of parameters such as "unavailable", "pedestrian", "pedal cyclist", "worker on road (public safety worker)", "animal", or the like. The parameter of "basic type" 701 may be set by user input. Alternatively, the parameter of "basic type" 701 may be set according to sensing information obtained by the electronic device 101. For example, when the speed of the electronic device 101 corresponds to the range of a walking speed, the electronic device 101 (e.g., the processor 120) may determine the parameter of "basic type" 701 as "pedestrian". When the speed of the electronic device 101 corresponds to the range of a cycle running speed, the electronic device 101 (e.g., the processor 120) may determine the parameter of "basic type" 701 as "pedal cyclist".

"Timestamp" (sec mark) 702 may, for example, and without limitation, indicate timestamp information associated with the generation of a message (or a packet).

"Message count" (MSG count) 703 may, for example, and without limitation, indicate the number of messages generated by an object that generates a message.

"Identification" (ID) 704 may, for example, and without limitation, indicate the identification of a subject that generates a message. "Identification" 704 may be one of fixed identification or fluid identification. For example, when personal privacy protection is required, such as a smart phone, the electronic device 101 may use a fluid identification. However, an RSU may use a fixed identification.

"Position" 705 may, for example, and without limitation, indicate information associated with at least one of the latitude, the longitude, and the altitude of the electronic device 101, and additional information associated with a region where the electronic device 101 is located may be further included at "position" 705. Although the electronic device 101 may indicate information on 3-dimensional coordinates, based on the unit (e.g., cm, 1/10 micro degree, or 1/10 micro degree) of a World Geodetic System (WGS), any scheme that is capable of indicating a 3-dimensional position can be used. For example, the electronic device 101 may identify information associated with at least one of a latitude, a longitude, and an altitude via a GPS module. The electronic device 101 may identify, for example, information associated with the altitude of the electronic device 101 via an altitude measurement module, and the method of determining the information associated with position is not limited.

"Accuracy" 706 may, for example, and without limitation, indicate the accuracy of position information along each axis (e.g., three axes in the WGS). The electronic device 101 (e.g., the processor 120) may determine the accuracy of the position information of the electronic device 101 identified by various existing schemes, and the method of determining the accuracy is not limited.

"Speed" 707 may, for example, and without limitation, indicate the speed of the electronic device 101, and the electronic device 101 (e.g., the processor 120) may determine the speed of the electronic device 101 based on sensing data obtained from, for example, an acceleration sensor, and the method of determining a speed is not limited.

"Heading" 708 may, for example, and without limitation, indicate information associated with the direction in which the electronic device 101 is moving. For example, information associated with the direction may be expressed based on units of a 360-degree angle system in a two-dimensional plane, but the method of indicating a direction is not limited. The electronic device 101 (e.g., the processor 120) may store a path history that is recorded as the electronic device 101 moves, and may determine information associated with the direction in which the electronic device 101 is moving based on the path history analysis result. Alternatively, the electronic device 101 may determine the direction in which the electronic device 101 is moving based on data obtained from at least one of a geomagnetic field sensor and a gyro sensor, and the method of determining a heading is not limited.

According to the WAVE standard, the data fields 701 to 708 may be designated as information that is essentially included in a PSM. However, the electronic device 101 (e.g., the processor 120) according to various embodiments may transmit a communication signal that does not include at least some of the data fields 701 to 708. That is, the information included in a communication signal transmitted by the electronic device 101 according to various embodiments is not limited.

"Acceleration set" (accel set) 709 for each axis may, for example, and without limitation, indicate acceleration information for each axis of the electronic device 101. The electronic device 101 may determine acceleration information for each axis of the electronic device 101 via various sensors, such as an acceleration sensor, a gyro sensor, or the like, and the method of determining acceleration information is not limited.

"Path history" 710 may, for example, and without limitation, indicate information associated with the history of movement made by the electronic device 101 from the initial position. For example, in the case of "path history" 710, the initial position of the electronic device 101 and the offset value of subsequent movement may be expressed as any one value selected from among a longitude coordinate, a latitude coordinate, and an altitude coordinate. The electronic device 101 (e.g., the processor 120) may measure at least one of a longitude, a latitude, and an altitude, and may determine information associated with a path history using the multiple measurement data. The method of determining the information associated with a path history is not limited.

"Propulsion" 711 may, for example, and without limitation, indicate the entity that propels the electronic device 101. For example, "propulsion" 711 may include a parameter such as "human-propelled type", "animal-propelled type", "motor-propelled type", or the like. For example, the electronic device 101 (e.g., the processor 120) may determine the parameter of propulsion based on the speed of the electronic device 101, but the method of determining the propulsion is not limited.

"Use state" 712 may, for example, and without limitation, indicate information associated with an operation performed by the electronic device 101.

"Use state" 712 may include at least one of parameters such as "unavailable", "not defined (other)", "idle", "listening to audio other than phone call (listening to audio)", "typing", "calling", "playing game", "reading", "content viewing", and the like. "Reading" may be a state in which content including a relatively insignificant screen change over time, such as e-book content, web-browser content, or the like, is displayed. "Content viewing" may be a state in which content including a relatively significant screen change over time is displayed. The electronic device 101 (e.g., the processor 120) may determine the use state of the electronic device 101 based on the content type of currently displayed content, whether audio data is currently output, the application type of an executed application, whether input is provided via an input device, or the like. The method of determining the use state is not limited.

"Cross request" 713 may, for example, and without limitation, indicate whether a pedestrian is to cross a crosswalk. For example, the electronic device 101 may receive a communication single from an RSU located at a crosswalk, and may determine that the electronic device 101 is located at the crosswalk, based on at least one of the position information and identification information of the RSU. In addition, the electronic device 101 (e.g., the processor 120) may determine that the degree of movement of the electronic device 101 is less than a previously designated value, thereby determining that a pedestrian who carries the electronic device 101 is waiting around the crosswalk. The method by which the electronic device 101 determines whether a pedestrian is to cross a crosswalk is not limited.

"Cross state" 714 may, for example, and without limitation, indicate whether a pedestrian currently crosses a crosswalk. The electronic device 101 (e.g., the processor 120) may determine that the electronic device 101 is located at a crosswalk and that the degree of movement of the electronic device 101 is greater than or equal to a previously designated value. Accordingly, the electronic device 101 may determine whether a pedestrian who carries the electronic device 101 currently crosses the crosswalk. The method by which the electronic device 101 determines whether a pedestrian currently crosses a crosswalk is not limited.

"Cluster size" 715 may, for example, and without limitation, indicate the number of persons included in a pedestrian cluster. Alternatively, "cluster size" 715 may indicate the physical size of a pedestrian cluster, and may be expressed as a cluster radius. Alternatively, a PSM may distinguish a cluster size and a cluster radius. The electronic device 101 (e.g., the processor 120) may determine the physical size or the size of a pedestrian cluster, based on, for example, user input. Alternatively, the electronic device 101 (e.g., the processor 120) may determine the physical size or the size of a pedestrian cluster, based on a communication signal from another electronic device carried by another user. The method by which the electronic device 101 determines a cluster size is not limited.

"Event responder type" 716 may, for example, and without limitation, indicate the type of public safety worker that responds to an event. The electronic device 101 (e.g., the processor 120) may determine the type of public safety worker (e.g., a tow operator, an emergency medical service worker, a transport department worker, a law enforcement worker, a hazmat responder, an animal control worker, or the like) based on user input. The method of determining the type of public safety worker is not limited.

"Activity type" 717 may, for example, and without limitation, indicate the type of work on a road. "Activity sub-type" 718 may, for example, and without limitation, indicate the type of worker on a road (e.g., a police officer, a crossing guard, a soldier, or an emergency situation manager, or the like). "Assist type" 719 may, for example, and without limitation, indicate whether a pedestrian has a handicap, such as visual handicap, hearing handicap, physical handicap, mental handicap, or the like. "Sizing" 720 may, for example, and without limitation, indicate information associated with the height of a user (e.g., whether a user is a child or an adult, or whether a user is hidden by a neighboring landmark). "Attachment" 721 may, for example, and without limitation, indicate an object (e.g., a stroller, a cart, or a wheelchair) that moves together with a pedestrian. "Attachment radius" 722 may, for example, and without limitation, indicate the size of an object that moves together with a pedestrian. "Animal type" 723 may, for example, and without limitation, indicate the type of animal (e.g., a guide dog). The electronic device 101 (e.g., the processor 120) may determine the type of work on a road, the type of worker, the assistance type, sizing, the attachment, the attachment size, the animal type, or the like, based on user input, but the method of determining the same is not limited.

When the electronic device 101 (e.g., the processor 120) receives identification information from an RSU, or when the current position of the electronic device 101 satisfies a designated condition, the electronic device 101 (e.g., the processor 120) may transmit a PSM including at least a part of the information of FIG. 7.

Figure 8:
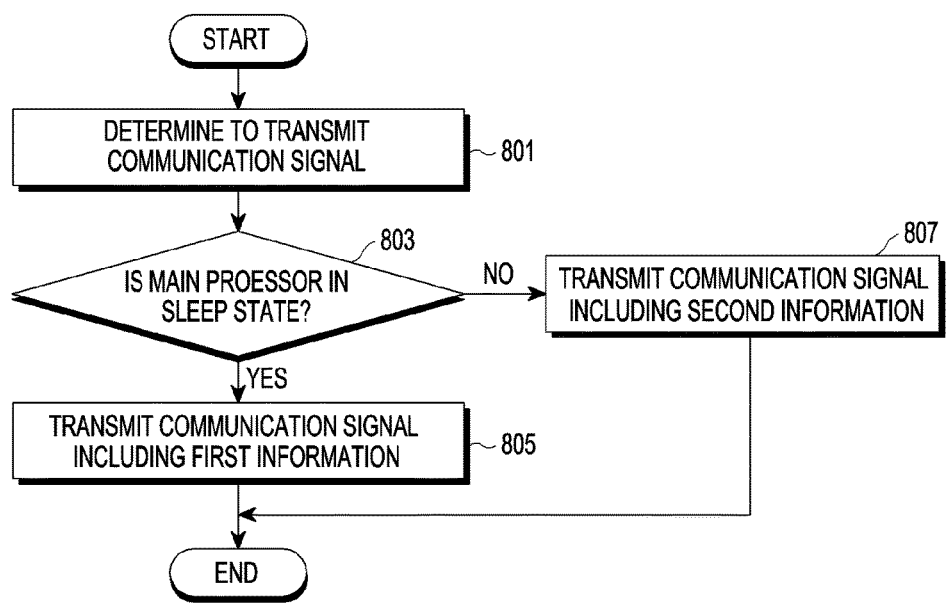
FIG. 8 is a flowchart illustrating a method of operating an electronic device according to various embodiments.

FIG. 8 is a flowchart illustrating a method of operating an electronic device according to various embodiments.

In operation 801, the electronic device 101 (e.g., the processor 120) may determine to transmit a communication signal. For example, when previously designated identification information, such as the identification information of an RSU, is received, or when a condition is satisfied, such as the case in which the position of the electronic device 101 corresponds to a previously designated position, the electronic device 101 may determine to transmit a communication signal.

In operation 803, the electronic device 101 may determine whether the main processor 121 is in the sleep state. Whether the main processor 121 is in the sleep state may be determined by, for example, the sub-processor 123. When it is determined that the main processor 121 is in the sleep state, the electronic device 101 may transmit a communication signal including first information in operation 805. When it is determined that the main processor 121 is not in the sleep state, the electronic device 101 may transmit a communication signal including second information in operation 807. The electronic device 101 may configure the information included in a communication signal when the main processor 121 is in the sleep state to be different from the information when the main processor 121 is not in the sleep state. As an example, the electronic device 101 may include a PSM defined in the WAVE standard in a communication signal. As illustrated in FIG. 7, at least some fields of the PSM (e.g., the fields 701 to 708) may be essentially included in the PSM, as described in the standard. When the main processor 121 is in the sleep state, the electronic device 101 may transmit a communication signal including a first field part of the PSM. When the main processor 121 is not in the sleep state, the electronic device 101 may transmit a communication signal including a second field part of the PSM. The second field part may be all fields of the PSM.

According to various embodiments, the electronic device 101 may equally transmit a communication signal including the same fields for both of the cases when the main processor 121 is in the sleep state and when the main processor 121 is not in the sleep state. For example, the electronic device 101 may transmit a communication signal including all fields of the PSM when the main processor 121 is not in the sleep state, and may transmit a communication signal including all fields of the PSM even when the main processor 121 is in the sleep state. In this instance, information included in the fields when the main processor 121 is in the sleep state and information included in the fields when the main processor 121 is not in the sleep state may be different from each other. For example, before the main processor 121 enters the sleep state, the main processor 121 may determine information associated with all fields of the PSM, and corresponding information may be stored in a storage that a WAVE communication module can access. The main processor 121 may perform updating and may enter the sleep state when the corresponding storage updates. Accordingly, a communication signal including information that is determined last before the main processor 121 enters the sleep state may be transmitted, the determined information being different from information at the current point in time. According to various embodiments, the sub-processor 123 may update information of at least some of the fields of a communication signal. In this instance, a communication signal transmitted by the electronic device 101 may include information reflecting the current situation updated by the sub-processor 123 and information that is determined last before the main processor 121 enters the sleep state. When the main processor 121 is not in the sleep state, information at the current point in time is included, and thus the information in the case in which the main processor 121 is in the sleep state and the information in the case in which the main processor 121 is not in the sleep state may be different from each other. For example, a main memory (e.g., the memory 130) may store all the paths of movement of the electronic device 101. However, before the main processor 121 enters the sleep state, the main processor 121 may store at least some of the paths of movement in a storage that the WAVE communication module can access. Accordingly, when the main processor 121 is not in the sleep state, the paths of movement that have been stored in the main memory are included in a communication signal. However, when the main processor 121 is in the sleep state, some of the paths of movement that have been stored in the storage that the WAVE communication module can access may be included in a communication signal.

As another example, the electronic device 101 may determine information included in "basic type" 701 of the PSM. In the case in which the main processor 121 is in the sleep state, when a vehicle is changed from a pedestrian to a cycle or the like, the parameter may not be updated using a normal method. Therefore, the sub-processor 123, which continuously operates, may determine that the movement speed of a user is greater than or equal to a predetermined speed, and may perform control such that the main processor 121 enters the wake-up state to change parameter information or such that the sub-processor 123 enables the WAVE communication module to directly change the corresponding parameter.

As another example, the electronic device 101 may determine information included in "propulsion" 711 of the PSM. When the sub-processor 123 continuously senses a speed that is unreachable by a user's walking speed, the sub-processor 123 may perform control such that the main processor 121 enters the wake-up state to change parameter information or such that the sub-processor 123 enables the WAVE communication module to directly change the corresponding parameter.

As another example, the electronic device 101 may determine information included in "cluster size" 715. In the case in which the main processor 121 is in the sleep state, when information associated with the number of persons included in a small network is changed, or when the number of network peers is changed, the WAVE communication module may update the changed information, and may transmit the updated information to the main processor 121. The electronic device 101 may determine information to be included in "cluster size" 716. The WAVE communication module may calculate the physical distance to a cluster connected to a network using a parameter, such as identified GPS, GNSS, RSSI, or the like, and may record a parameter related to the radius of the cluster based on the calculated value.

Figure 9:
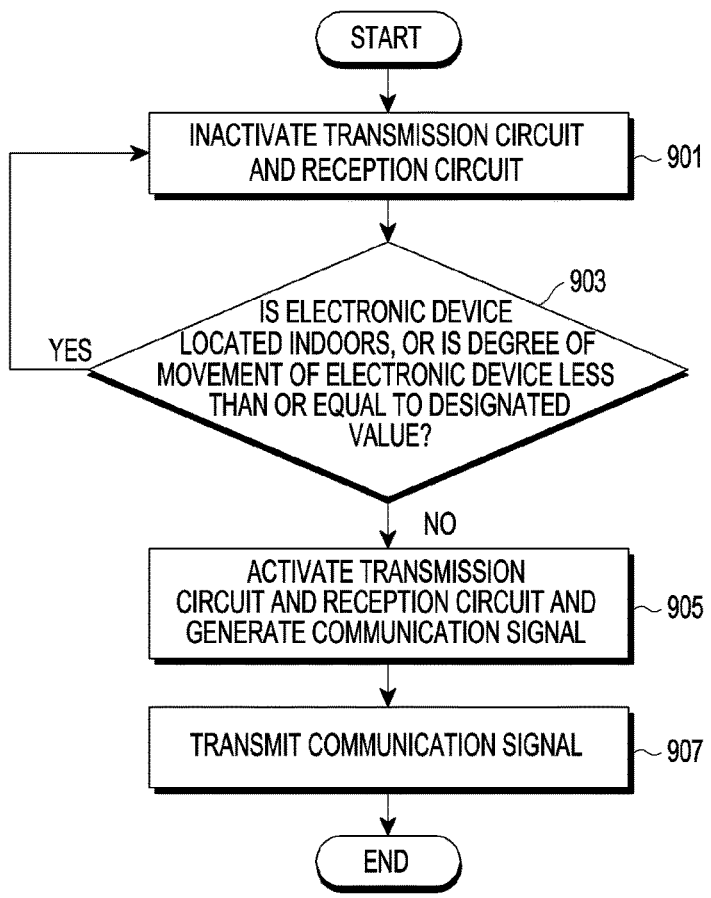
FIG. 9 is a flowchart illustrating a method of operating an electronic device according to various embodiments.

FIG. 9 is a flowchart illustrating a method of operating an electronic device according to various embodiments.

In operation 901, the electronic device 101 (e.g., the processor 120) may inactivate a transmission circuit and a reception circuit. In operation 903, the electronic device 101 may determine whether the electronic device 101 is located indoors, or whether the degree of movement of the electronic device 101 is less than or equal to a designated value. When it is determined that the electronic device 101 is located indoors, or when the degree of movement of the electronic device 101 is less than or equal to a designated value, the electronic device 101 may maintain the transmission circuit and the reception circuit of the WAVE communication module in the inactive state. When the electronic device 101 is located indoors, a GPS (GNSS) value may not be received. Essential information of the WAVE data is position information, and thus it is determined that electronic device 101 does not need WAVE communication. Therefore, for optimal power consumption, when the electronic device 101 is incapable of receiving satellite information or when the electronic device 101 receives position information via a satellite signal or a Wi-Fi AP, the electronic device 101 may analyze whether the corresponding GPS value is a value corresponding to an indoor place or a value corresponding to an outdoor place utilizing map information included in the device, position information obtained from an external server, or the like. The electronic device 101 may determine whether to perform a WAVE operation using the information thereon. Also, even in the case in which the electronic device 101 is located outdoors, when the electronic device 101 is not around a predetermined RSU, or is not close to a road, the electronic device 101 may be located in a fixed place. In this instance, a WAVE operation may not be needed and thus, the transmission circuit and the reception circuit of the WAVE communication module may be inactivated. The electronic device may activate the WAVE operation when the degree of movement exceeds a designated value. The electronic device 101 may activate the transmission circuit and the reception circuit of the WAVE communication module, and may generate a communication signal in operation 905.

In operation 907, the electronic device 101 may transmit a communication signal. According to another embodiment, when it is determined that the electronic device 101 is located outdoors or that the degree of movement of the electronic device 101 exceeds a designated value, the electronic device 101 may activate the reception circuit of the WAVE communication module to scan a communication signal. Subsequently, when a communication signal including the identification information of an RSU is received via the activated reception circuit, the electronic device 101 may activate the transmission circuit. The electronic device may transmit a communication signal including, for example, a PSM, via the activated transmission circuit.

Figure 10A:
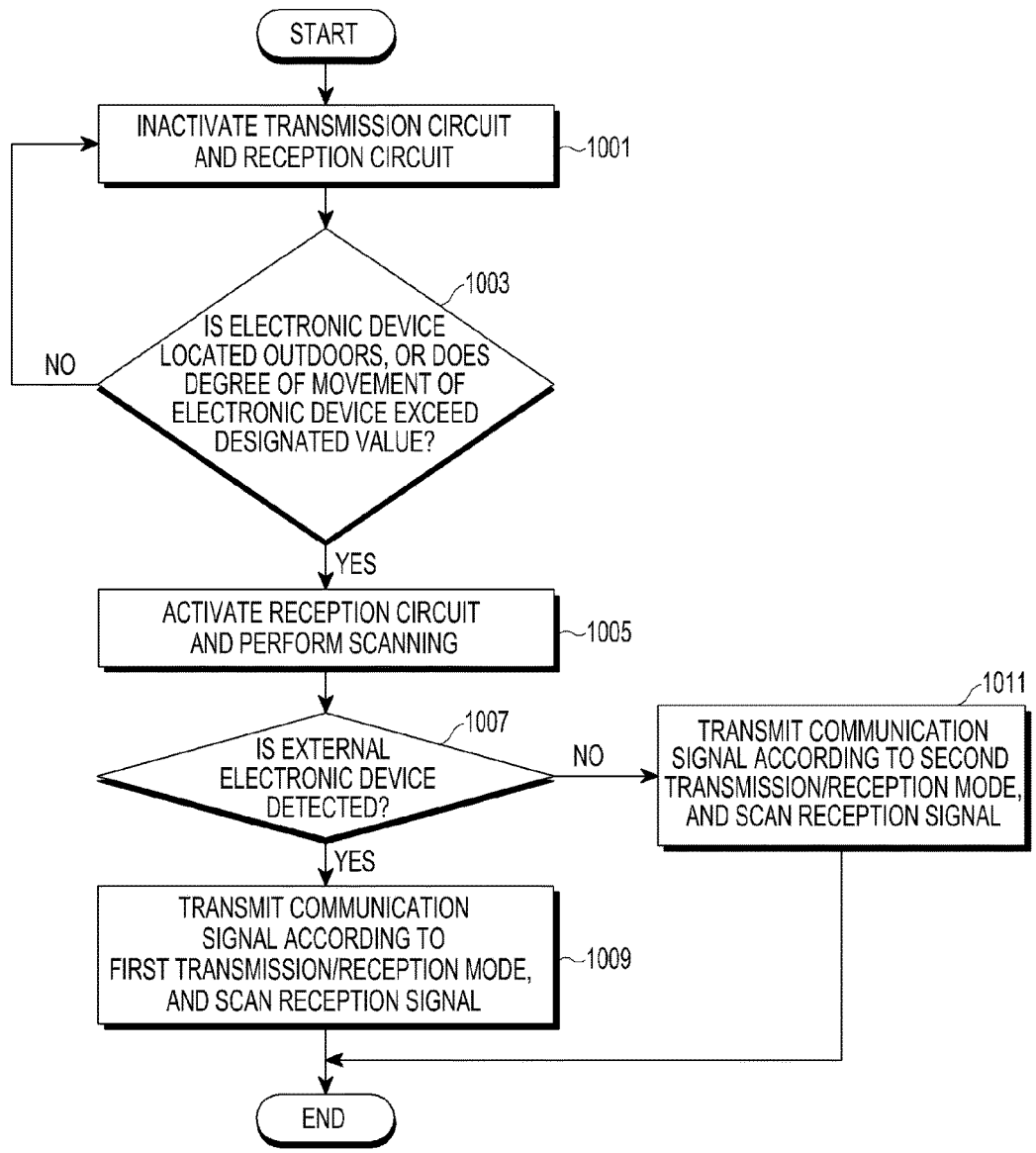
FIGS. 10A and 10B are flowcharts illustrating a method of operating an electronic device according to various embodiments.
Figure 10B:
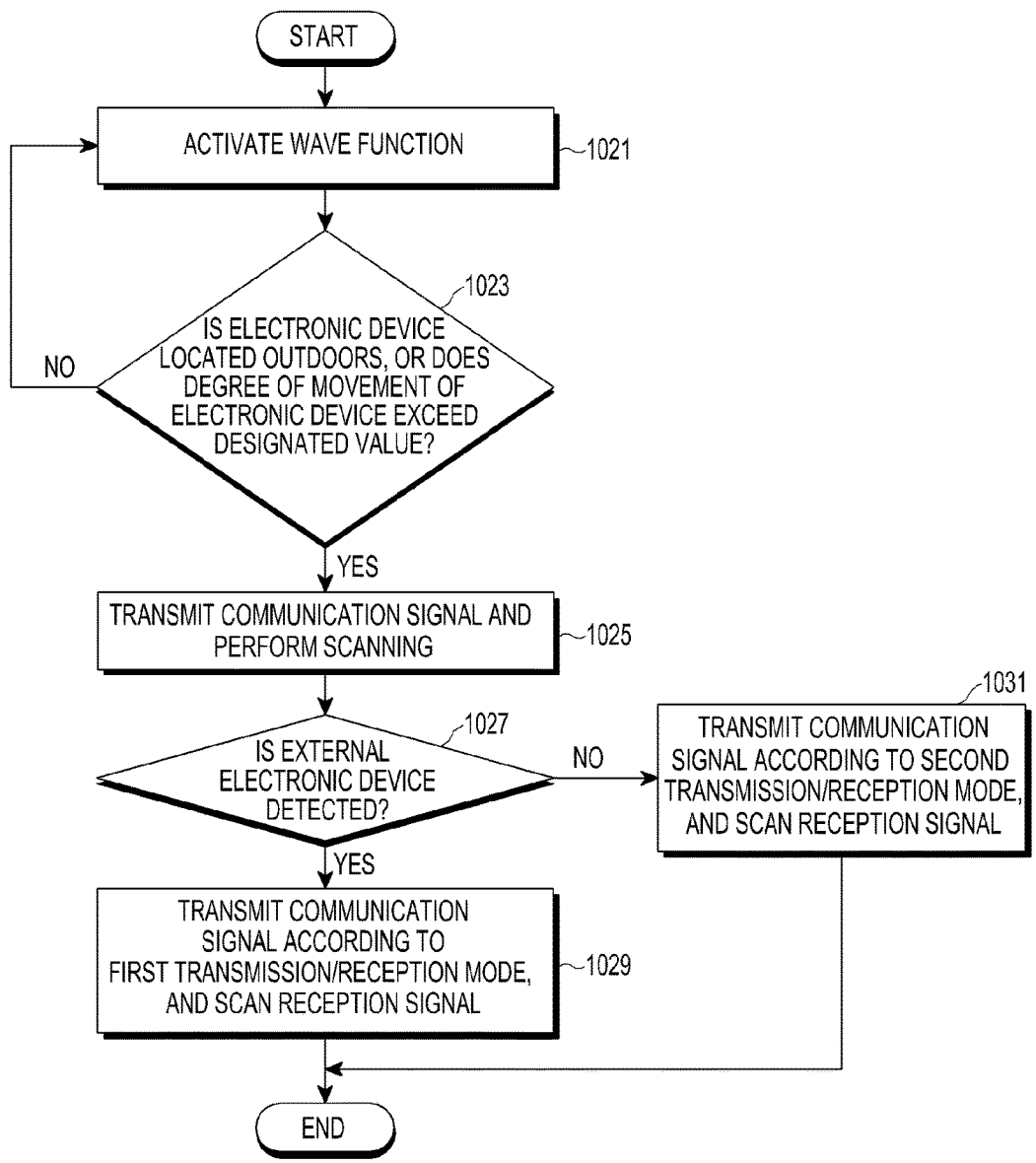

FIGS. 10A and 10B are flowcharts illustrating a method of operating an electronic device according to various embodiments.

In operation 1001, the electronic device 101 (e.g., the processor 120) according to various embodiments may inactivate a transmission circuit and a reception circuit.

In operation 1003, the electronic device 101 may determine whether the electronic device 101 is located outdoors, or whether the degree of movement of the electronic device 101 exceeds a designated value. When it is determined that the electronic device is located outdoors or that the degree of movement of the electronic device exceeds a designated value, the electronic device 101 may activate the reception circuit and may perform scanning in operation 1005.

In operation 1007, the electronic device 101 may detect an external electronic device via the activated reception circuit. For example, the electronic device 101 may detect the external electronic device, based on identification information included in the received communications signal. When it is determined that the external electronic device is detected, the electronic device 101 may transmit a communication signal according to a first transmission/reception mode, and may scan a reception signal in operation 1009. For example, the electronic device 101 may transmit a communication signal, and may scan a reception signal by setting a relatively short interval. When it is determined that an external electronic device is not detected, the electronic device 101 may transmit a communication signal according to a second transmission/reception mode, and may scan a reception signal in operation 1011. For example, the electronic device 101 may not be located in a traffic zone, and thus, the electronic device 101 may set a relatively long interval for reception scanning, and may not transmit a communication signal. When the electronic device 101 transmits a communication signal according to the second transmission/reception mode, a transmission interval may be set to be relatively longer than that of the first transmission/reception mode. As another example, when an external electronic device is detected, the electronic device 101 may scan a communication signal or transmit a communication signal at relatively short intervals, or may perform unicast communication with the external electronic device. When an external electronic device is not detected, the electronic device 101 may scan a communication signal or transmit a communication signal at relatively long intervals. The electronic device 101 may filter out a packet that is not registered in an RSU, and may transmit only data associated with an RSU to the processor 120.

FIG. 10B is a flowchart illustrating a method of operating an electronic device according to various embodiments.

In operation 1021, the electronic device 101 (e.g., the processor 120) may activate a WAVE function. For example, the electronic device 101 may activate a WAVE function included in an electronic device according to user input. When the WAVE function is activated, the electronic device 101 may determine an operation scheme based on position information or movement information of the electronic device 101.

In operation 1023, the electronic device 101 may determine whether the electronic device 101 is located outdoors, or whether the degree of movement of the electronic device 101 exceeds a designated value. When the electronic device 101 is located indoors, or when the degree of movement of the electronic device 101 is less than or equal to a designated value, the electronic device 101 may perform neither communication signal scanning nor communication signal transmission. Determining whether the electronic device 101 is located indoors or determining the degree of movement may be periodically or aperiodically performed. When it is determined that the electronic device 101 is located outdoors, or when the degree of movement exceeds a designated value, the electronic device 101 transmits a communication signal, and may perform scanning in operation 1025. For example, the electronic device 101 may transmit a communication signal including a PSM, and may periodically scan a communication signal from a neighboring entity.

In operation 1027, the electronic device 101 may determine whether an external electronic device is detected, based on identification information included in a received communications signal. When it is determined that the external electronic device is detected, the electronic device 101 may transmit a communication signal according to a first transmission/reception mode, and may scan a reception signal in operation 1029. For example, the electronic device 101 may transmit a communication signal, and may scan a reception signal by setting a relatively short interval. In operation 1031, the electronic device 101 may transmit a communication signal according to a second transmission/ reception mode, and may scan a reception signal when it is determined in operation 1027 that the external electronic device is not detected. For example, the electronic device 101 may set a relatively long interval for reception scanning, and may not transmit a communication signal. When the electronic device 101 transmits a communication signal according to a second transmission/reception mode, the electronic device 101 may set a transmission interval relatively longer than that of the first transmission/reception mode. The electronic device 101 may compare the current position of the electronic device 101 and information associated with a road area included in the received communication signal together with the identification information, and when the comparison result shows that the electronic device 101 is located close to the road, the electronic device 101 may transmit a communication signal including a PSM.

Figure 11A:
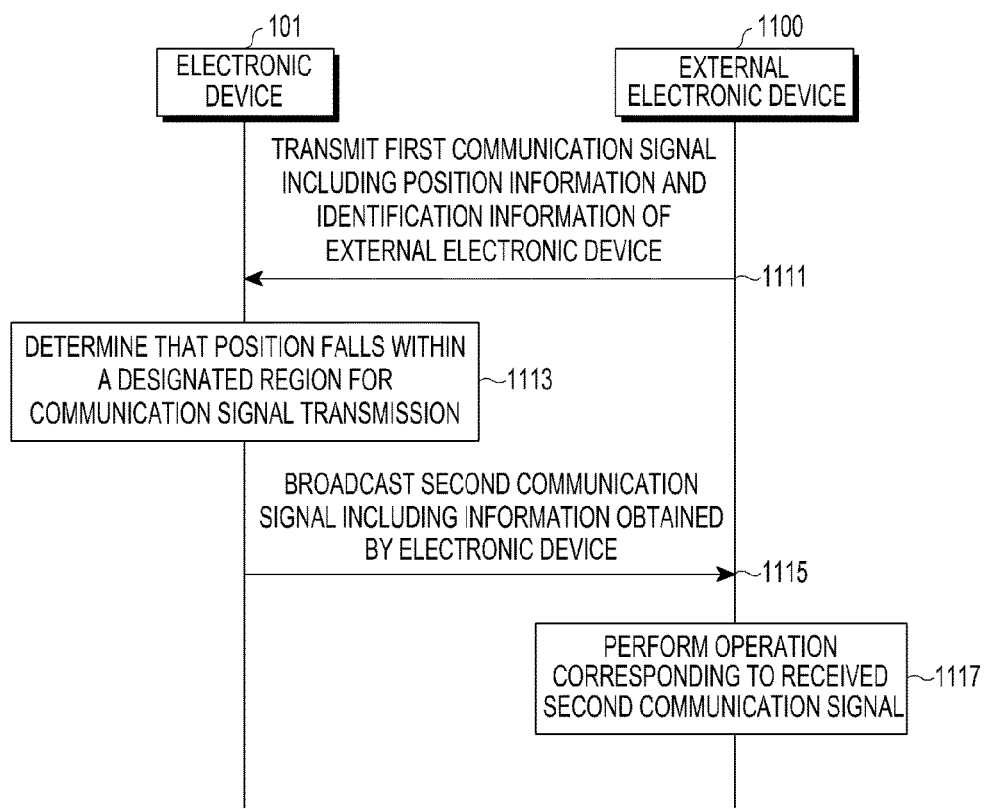
FIGS. 11A and 11B are flowcharts illustrating a method of operating an electronic device and an external electronic device according to various embodiments.

FIG. 11A is a flowchart illustrating a method of operating an electronic device and an external electronic device according to various embodiments.

In operation 1111, an external electronic device 1100 may transmit a first communication signal including the position information and the identification information of the external electronic device 1100 to the electronic device 101.

In operation 1113, the electronic device 101 (e.g., the processor 120) may determine that the position falls within a designated region for communication signal transmission, based on information included in the first communication signal. For example, the electronic device 101 may determine the position information of information associated with a crosswalk, based on the information included in the first communication signal. The electronic device 101 may obtain the position information of the crosswalk, and may compare the position information with the current position of the electronic device 101, thereby determining that a user is currently located close to the crosswalk. When it is determined that a crosswalk exists at a place to which the electronic device 101 is expected to move, based on path history or heading information in the PSM, the electronic device 101 may change a cross request parameter of the fields in the PSM.

In operation 1115, the electronic device 101 may broadcast a second communication signal including sensing information or determined information (e.g., a communication signal including a PSM) obtained by the electronic device 101. For example, the electronic device 101 may broadcast the second communication signal reflecting a cross request parameter.

In operation 1117, the external electronic device 1100 may perform an operation corresponding to the received second communication signal. For example, the external electronic device 1100 may control a signal of the corresponding crosswalk, or may transmit an alert message to a vehicle that enters the crosswalk. Also, when a user actually moves and enters the location of the crosswalk, the electronic device 101 may transmit a communication signal, the parameter of "cross state" of which has been updated, and the external electronic device 1100 may perform an operation corresponding to the communication signal.

Figure 11B:
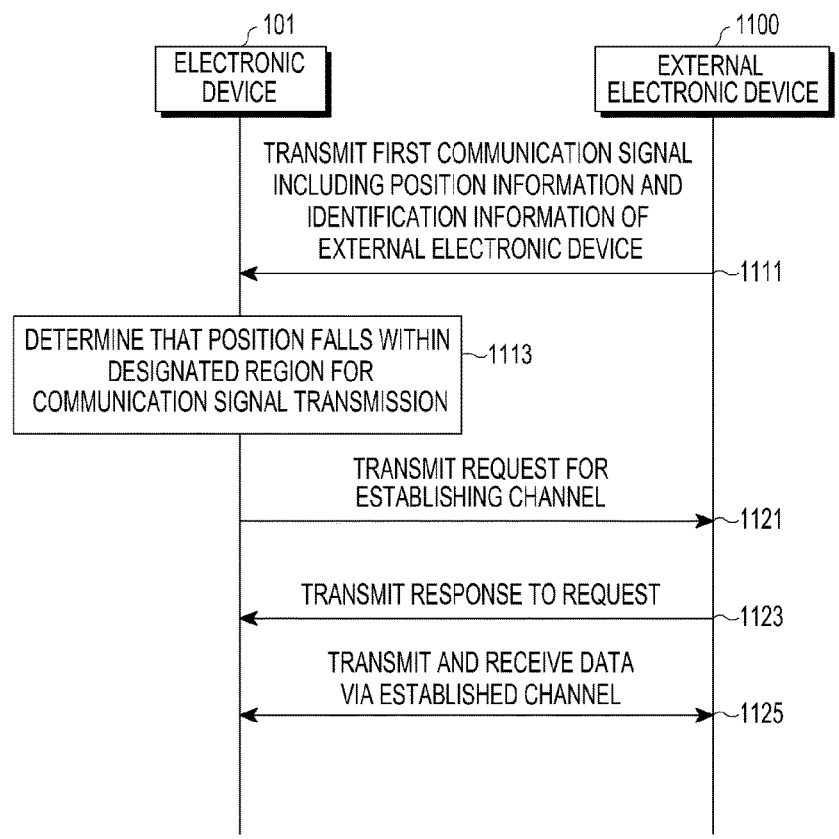

Referring to FIG. 11B, the electronic device 101 may transmit a request for establishing a channel, that is, a communication session, to the external electronic device 1100 using information associated with the external electronic device 1100 (e.g., identification, such as a MAC address or the like) in operation 1121.

In operation 1123, the external electronic device 1100 may transmit a response to the request. Accordingly, a channel, that is, a communication session, may be established between the electronic device 101 and the external electronic device 1100.

In operation 1125, the electronic device 101 and the external electronic device 1100 may transmit and receive data via the established channel. When a user is not in the vicinity of the external electronic device 1100, the communication session may be released as the distance between the electronic device 101 and the external electronic device 1100 increases. The external electronic device 1100 may establish channels with multiple electronic devices. When the risk between managed entities increases, the external electronic device 1100 may transmit an alert signal to the entity that is expected to have increased risk.

Figure 12A:
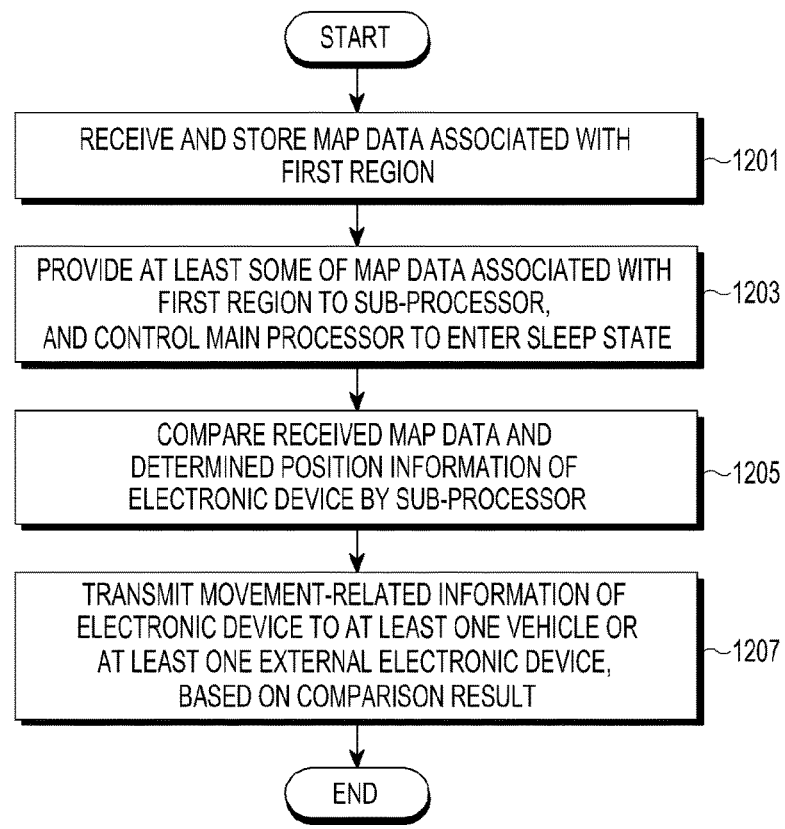
FIGS. 12A and 12B are flowcharts illustrating a method of operating an electronic device according to various embodiments.
Figure 12B:
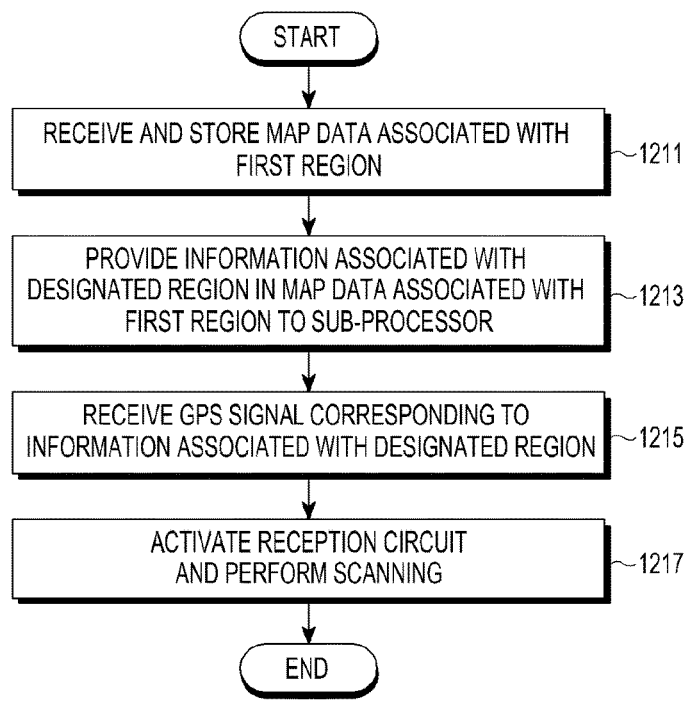

FIGS. 12A and 12B are flowcharts illustrating a method of operating an electronic device according to various embodiments.

In operation 1201, the electronic device 101 (e.g., the processor 120) may receive and store map data associated with a first region. When the electronic device 101 enters a predetermined region, the electronic device 101 may receive map data from a map-data-providing server, an RSU, or the like. The map data may be expressed as, for example, at least one value selected from among a latitude, a longitude, and an altitude. In the case of the map data, the range in which the electronic device 101 needs to transmit a communication signal may be expressed as at least one value from among a latitude, a longitude, and an altitude. For example, position information associated with a landmark included in a traffic zone, such as a road, a crosswalk, a traffic light, and an RSU, may be expressed as at least one value selected from among a latitude, a longitude, and an altitude.

In operation 1203, the electronic device 101 may provide at least a part of the map data associated with a first region to the sub-processor 123, for example, to a storage that the sub-processor 123 can access, and may control the main processor 121 to be in the sleep state.

In operation 1205, the electronic device 101 may compare the received map data and the determined position information of the electronic device 101 by the sub-processor 123.

In operation 1207, the electronic device 101 may transmit movement-related information of the electronic device 101 to at least one vehicle or at least one external electronic device based on the comparison result. When the current position of the electronic device 101 falls within a designated range in the map data, the electronic device 101 may activate a transmission circuit so as to transmit a communication signal. According to various embodiments, the electronic device 101 may determine the characteristic for each range included in the map data. For example, the electronic device 101 may receive map data as shown in Table 1.

TABLE 1

| Range | Position information | Identification information |
|---|---|---|
| First range | (A, B, C) | Roadside |
| Second range | (D, E, F) | Crosswalk |

Position information (A, B, C) or (D, E, F) may be a value expressed as the range of a latitude, a longitude, or an altitude. The scheme for expressing position information is not limited.

When it is determined that the current position information of the electronic device 101 falls within the range of (D, E, F), the electronic device 101 may transmit a communication signal by reflecting the same to the parameter of "cross request" of a PSM. That is, the electronic device 101 may determine information included in the communication signal based on information included in the map data.

Referring to FIG. 12B, the electronic device 101 (e.g., the processor 120) may receive and store map data associated with a first region in operation 1211.

In operation 1213, the electronic device 101 may provide information associated with a designated area (region) in the map data associated with the first region to the sub-processor 123.

In operation 1215, the electronic device 101 may receive a GPS signal corresponding to the information associated with the designated area (region). That is, the electronic device 101 may determine whether the current position of the electronic device falls within a designated range based on the map data.

In operation 1217, the electronic device 101 may activate a reception circuit and scan a communication signal. Subsequently, when a communication signal is received from an RSU, the electronic device 101 may activate a transmission circuit, and may transmit a communication signal via the activated transmission circuit. The electronic device 101 may set comparing the map data and the current position as a condition for triggering communication signal scanning.

A Communication Processor (CP) of the electronic device 101 according to various embodiments may also determine the current position of the electronic device 101, based on a geo-fence technology or the like. The CP (not illustrated) may also compare the current position of the electronic device 101 and position information associated with a previously stored region, and may determine whether to activate WAVE communication according to the comparison result. When activation of WAVE communication is determined, the CP may transmit the current position information of the electronic device 101 to a WAVE communication module, together with an activation command. The WAVE communication module may transmit a communication signal including at least one of the current position information or movement information of the electronic device 101. In this instance, both an AP and a GPS module may be in the sleep state, and the amount of battery power that is consumed may be reduced.

Figure 13:
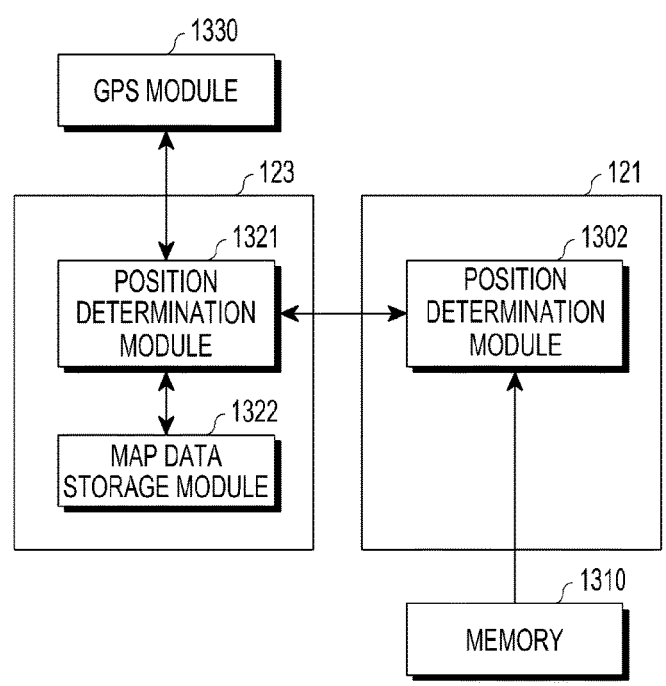
FIG. 13 is a block diagram illustrating an electronic device according to various embodiments.

FIG. 13 is a block diagram illustrating an electronic device according to various embodiments.

Referring to FIG. 13, the sub-processor 123 may be connected to a GPS module 1330 and to the main processor 121. The main processor 121 may access a memory 1310 (e.g., the memory 130). When the main processor 121 enters a predetermined region, the main processor 121 may receive map data via a communication circuit (not illustrated). The received map data may be stored in the memory 1310. A GPS module 1330 may receive a signal from a satellite, and may determine the current position of the electronic device 101. When the main processor 121 is in the wake-up state, the main processor 121 may obtain position information from the GPS module 1330. A position determination module 1302 of the main processor 121 may compare the position information and the map data stored in the memory 1310. When the position information corresponds to a designated area in the map data, the main processor 121 may control a communication circuit such that a communication signal including, for example, a PSM is transmitted. In the case in which the main processor 121 enters the sleep state, the main processor 121 may transmit at least a part of the map data to the sub-processor 123, whereby at least the part of the map data is stored in a map data storage module 1322. The map data storage module 1322 and the memory 1310 may be implemented as a single piece of hardware. A position determination module 1321 may compare position information received from the GPS module 1330 and the at least a part of the map data. When the position information corresponds to the designated area in the map data, the sub-processor 123 may control the communication circuit such that a communication signal including, for example, a PSM, is transmitted. Alternatively, when the position information corresponds to the designated area in the map data, the sub-processor 123 may transmit a signal for waking up the main processor 121 to the main processor 121.

Figure 14:
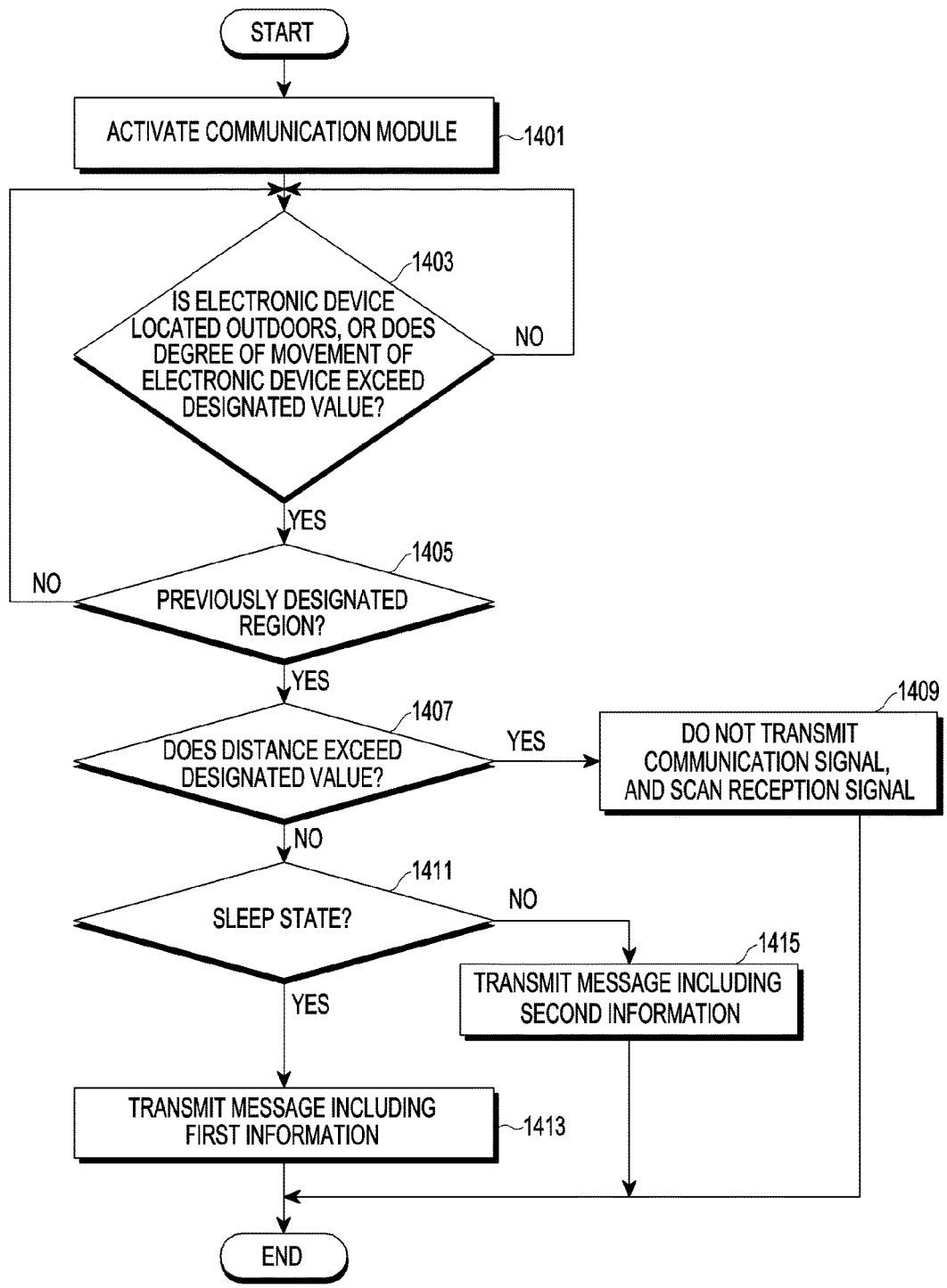
FIG. 14 is a flowchart illustrating a method of operating an electronic device according to various embodiments.

FIG. 14 is a flowchart illustrating a method of operating an electronic device according to various embodiments.

In operation 1401, the electronic device 101 (e.g., the processor 120) may activate a communication module.

In operation 1403, the electronic device 101 may determine whether the electronic device 101 is located outdoors, or whether the degree of movement of the electronic device 101 exceeds a designated value. When it is determined that the degree of the movement of the electronic device 101 exceeds the designated value, the electronic device 101 may determine whether the position of the electronic device 101 falls within a previously designated region in operation 1405. The previously designated region is a region designated for the electronic device 101 to transmit a communication signal including, for example, a PSM, which may be a region, such as a roadside, an area close to a crosswalk, or the like. For example, the electronic device 101 may determine whether the electronic device 101 is located in the designated region, based on the reception of the identification information of an external electronic device or the result of a comparison between the map data and the current position. When it is determined that the electronic device 101 is located in the previously designated region, the electronic device 101 may determine the distance between the electronic device 101 and the external electronic device, and may determine whether the distance exceeds a designated value in operation 1407. For example, the electronic device 101 may determine the distance between the electronic device 101 and the external electronic device based on a difference between information associated with a transmission timestamp included in a communication signal from the external electronic device and the point in time when the communication signal is received. Alternatively, the electronic device 101 may compare the current position obtained via a GPS module (e.g., GPS coordinates) and the position (e.g., GPS coordinates) at a predetermined point (e.g., a road, a crosswalk, or the like) in the map data, and may determine the distance between the electronic device 101 and the external electronic device.

When it is determined that the distance exceeds a designated value, the electronic device 101 may not transmit a communication signal, and may perform scanning of a reception signal in operation 1409. When it is determined that the distance is less than or equal to the designated value, the electronic device 101 may determine whether the state is the sleep state in operation 1411. When it is determined that the state is the sleep state, the electronic device 101 may transmit a message including first information in operation 1413. When it is determined that the state is the wake-up state, the electronic device 101 may transmit a message including second information in operation 1415.

According to various embodiments, the electronic device 101 may control a communication signal scanning interval, based at least on the distance between the electronic device 101 and the external electronic device.

Figure 15:
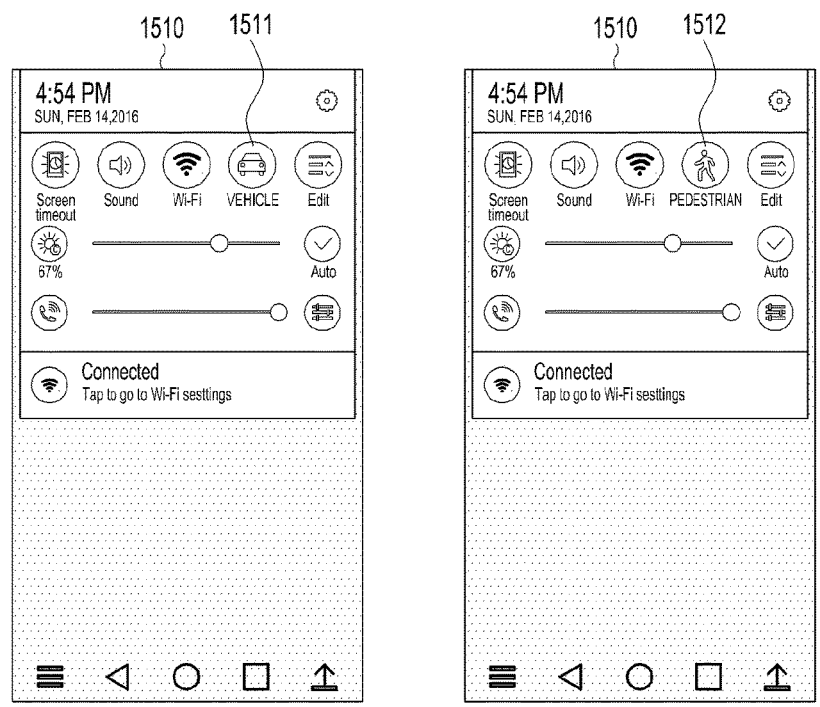
FIG. 15 is a diagram illustrating a screen displayed by an electronic device according to various embodiments.

FIG. 15 is a diagram illustrating a screen displayed by an electronic device according to various embodiments.

The electronic device 101 according to various embodiments may display a UI screen 1510 capable of controlling screen timeout, sound, Wi-Fi setting, or the like. The UI screen 1510 may include a WAVE icon 1511. In FIG. 15, the WAVE icon 1511 may be an icon indicating a vehicle, and may be changed to an icon 1512 indicating a pedestrian according to user designation. The electronic device 101 may reflect a designated type to a PSM, and may transmit a communication signal. In addition, the electronic device 101 may inactivate WAVE, based on user input.

Figure 16A:
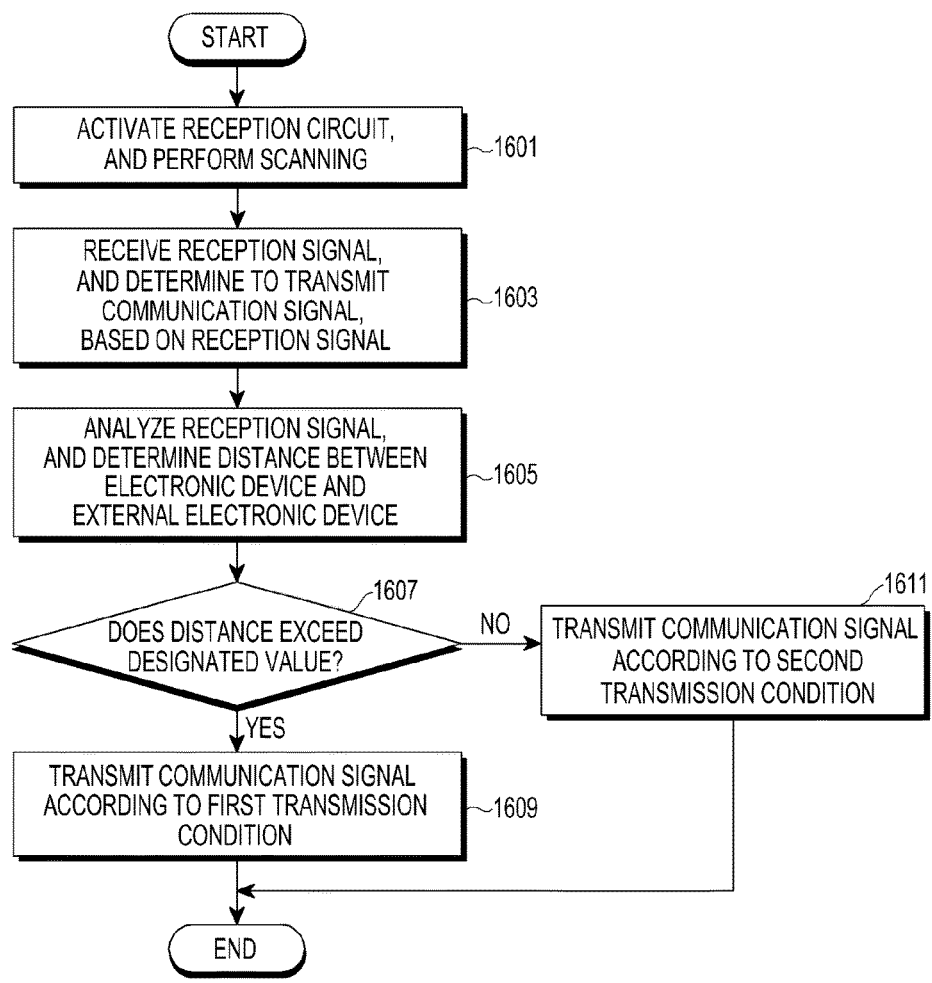
FIGS. 16A and 16B are flowcharts illustrating a method of operating an electronic device according to various embodiments.
Figure 16B:
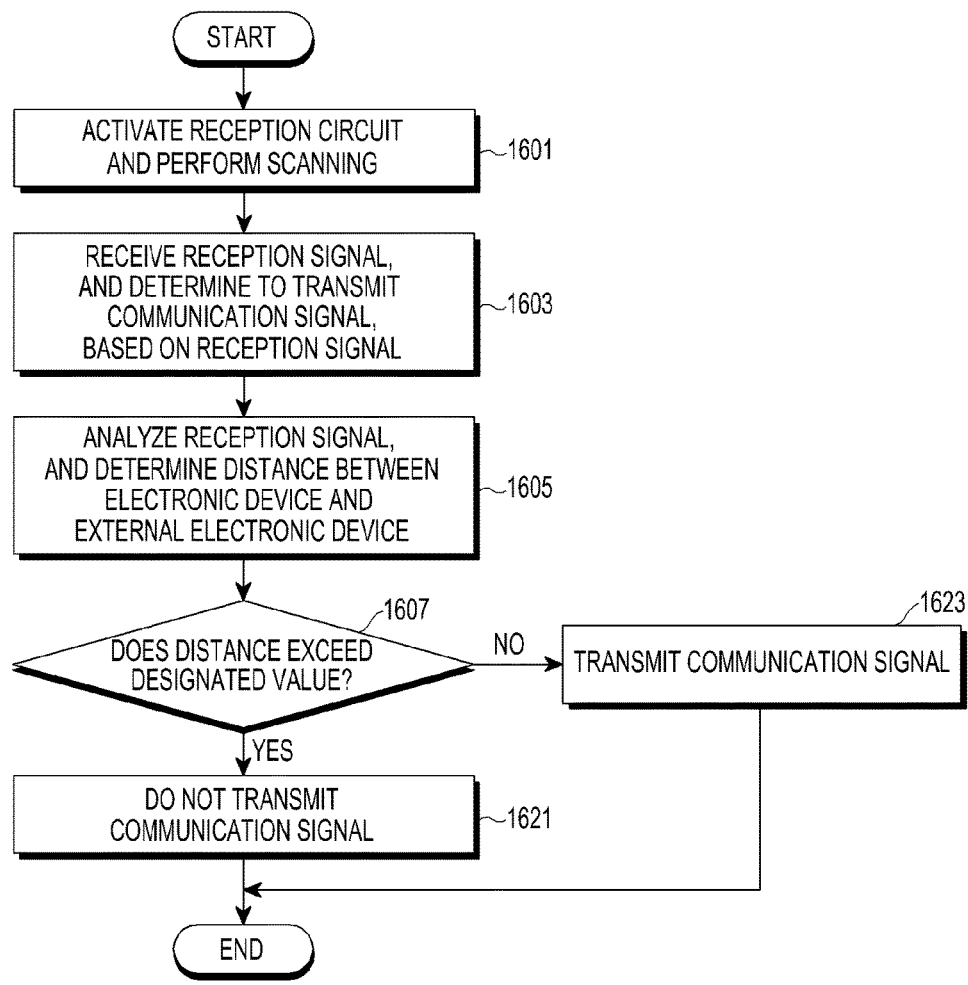
Figure 17:
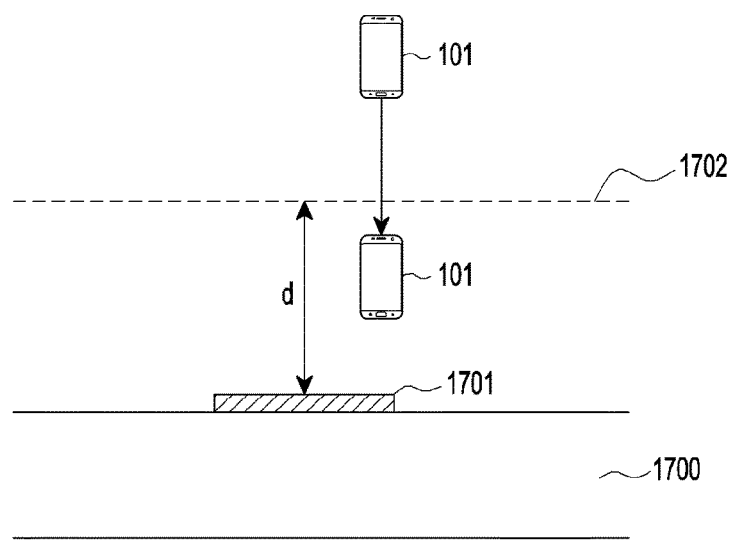
FIG. 17 is a diagram illustrating the position of an electronic device on a road according to various embodiments.

FIGS. 16A and 16B are flowcharts illustrating a method of operating an electronic device according to various embodiments. The embodiment of FIGS. 16A and 16B will be described in greater detail below with reference to FIG. 17. FIG. 17 is a diagram illustrating the position of an electronic device on a road according to various embodiments.

In operation 1601, the electronic device 101 (e.g., the processor 120) according to various embodiments may activate a reception circuit and may perform scanning.

In operation 1603, the electronic device 101 may receive a reception signal, and may determine whether to transmit a communication signal based on the reception signal. For example, when the identification information of an external electronic device is received, the electronic device 101 may determine to transmit a communication signal.

In operation 1605, the electronic device 101 may analyze the reception signal, and may determine the distance between the electronic device 101 and the external electronic device. For example, as illustrated in FIG. 17, an RSU 1701 may transmit a reception signal, and the reception signal may include information associated with the point in time at which the RSU 1701 transmits the reception signal. The electronic device 101 may determine the point in time at which the reception signal is received. The electronic device 101 may determine the distance between the electronic device 101 and the RSU 1701 based on a difference between the point in time at which the reception signal is received and the point in time at which the reception signal is transmitted, the transmission point information being included in the reception signal. Alternatively, the electronic device 101 may receive map data, and the map data may include GPS coordinates associated with the RSU 1701 or the road 1700. The electronic device 101 may determine the distance between the electronic device 101 and the RSU 1701, or the distance between the electronic device 101 and the road 1700, using the GPS coordinates of the electronic device 101, and, for example, the GPS coordinates of a road 1700, which are identified via a GPS module.

In operation 1607, the electronic device 101 may determine whether the determined distance exceeds a designated value. When it is determined that the distance exceeds the designated value, the electronic device 101 may transmit a communication signal according to a first transmission condition in operation 1609. For example, the electronic device 101 may transmit a communication signal at relatively long transmission intervals, or may transmit a communication signal with relatively low strength. Accordingly, the amount of power consumed by the electronic device 101 may be reduced. When the distance exceeds a designated value, it is determined that the electronic device 101 is located in a relatively safe area. Accordingly, the electronic device 101 may transmit a communication signal with relatively low power. When it is determined that the distance is less than or equal to the designated value, the electronic device 101 may transmit a communication signal according to a second transmission condition in operation 1611. For example, the electronic device 101 may transmit a communication signal at relatively short transmission intervals, or may transmit a communication signal with relatively strong strength. Accordingly, the electronic device 101 may transmit a communication signal at relatively short transmission intervals with strong strength within an area 1702, located within a threshold distance d from the RSU 1701, and may transmit a communication signal at relatively long intervals with low strength outside the area 1702, since the safety of a pedestrian may be relatively secured outside the area 1702. Accordingly, the usable lifetime of a battery may increase.

According to various embodiments, when it is determined that the distance exceeds the designated value, the electronic device 101 (e.g., the processor 120) may transmit a relatively large-sized communication signal. Accordingly, even when the distance is relatively long, the vehicle 220 may reliably receive the communication signal from the electronic device 101.

Referring to FIG. 16B, when it is determined that the distance exceeds a designated value, the electronic device 101 may not transmit a communication signal, and may maintain scanning a reception signal, in operation 1621. When it is determined that the distance is less than or equal to the designated value, the electronic device 101 may transmit a communication signal in operation 1623. Accordingly, the electronic device 101 does not transmit a communication signal outside the area 1702, since the safety of a pedestrian is relatively secured outside the area 1702. Accordingly, the usable lifetime of the battery may increase.

Figure 18:
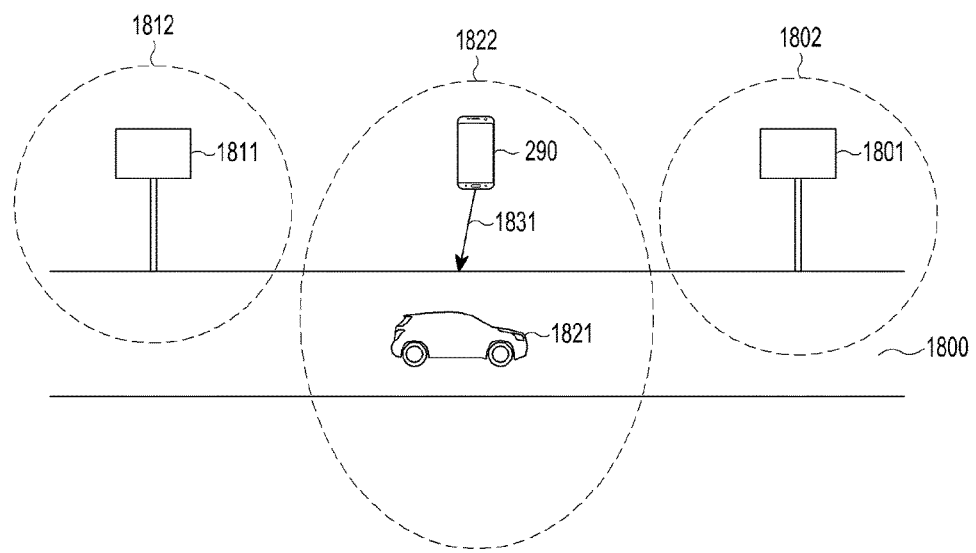
FIG. 18 is a diagram illustrating an electronic device, a roadside unit, and a vehicle according to various embodiments.

FIG. 18 is a diagram illustrating an electronic device, an RSU, and a vehicle according to various embodiments.

Referring to FIG. 18, RSUs (e.g., a first RSU 1801 or a second RSU 1811) may be located close to a road 1800. The first RSU 1801 may have a first communication range 1802, and the second RSU 1811 may have a second communication range 1812. Accordingly, there may be a shadow region where a communication signal is not received from the first RSU 1801 and the second RSU 1802. When the electronic device 101 (e.g., the mobile terminal device 290) is located as illustrated in FIG. 18, the electronic device 101 may be incapable of receiving a communication signal from either the first RSU 1801 or the second RSU 1802. In this instance, the electronic device 101 (e.g., the mobile terminal device 290) may be included in a communication range 1822 of the vehicle 1821, and may receive a communication signal including, for example, a BSM from the vehicle 1821. The electronic device 101 (e.g., the mobile terminal device 290) may take the reception of the identification of the vehicle 1821 as a trigger, and may transmit a communication signal 1831 including, for example, a PSM. The electronic device 101 (e.g., the mobile terminal device 290) may apply the process of processing the identification information of an RSU, which has been described in the present disclosure, to the process of processing the identification information of the vehicle 1821. For example, the electronic device 101 (e.g., the mobile terminal device 290) may determine a transmission condition based on the distance to the vehicle 1821, or may determine whether to transmit a communication signal 1831. The electronic device 101 (e.g., the mobile terminal device 290) may determine the distance between the electronic device 101 (e.g., the mobile terminal device 290) and the vehicle 1821 using the position information of the vehicle 1821, which is included in the BSM, and position information obtained via a GPS module. The electronic device 101 (e.g., the mobile terminal device 290) may determine whether to transmit a communication signal or a transmission condition used for transmitting a communication signal using another piece of information included in the BSM. For example, the electronic device 101 (e.g., the mobile terminal device 290) may be configured to transmit a communication signal when the vehicle's speed included in the BSM exceeds a previously designated value.

Figure 19:
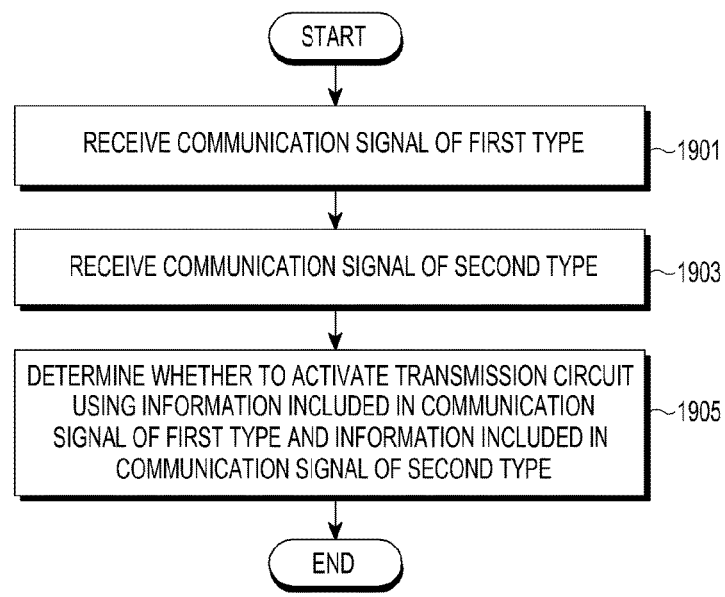
FIG. 19 is a flowchart illustrating a method of operating an electronic device according to various embodiments.
Figure 20:
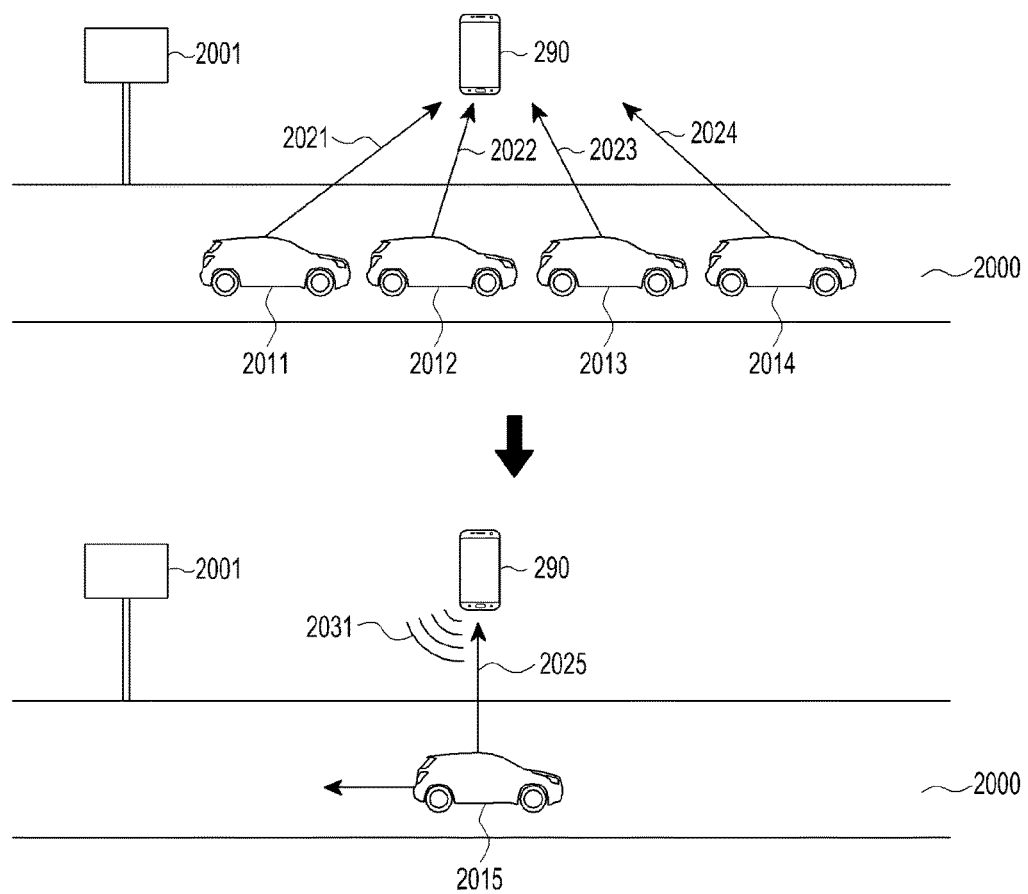
FIG. 20 is a diagram illustrating a mobile terminal device, a roadside unit, and a vehicle according to various embodiments.

FIG. 19 is a flowchart illustrating a method of operating an electronic device according to various embodiments. The embodiment of FIG. 19 will be described in greater detail below with reference to FIG. 20. FIG. 20 is a diagram illustrating an electronic device, an RSU, and a vehicle according to various embodiments.

In operation 1901, the electronic device 101 (e.g., the processor 120), such as the mobile terminal device 290 according to various embodiments, may receive a communication signal of a first type from an RSU 2001, as illustrated in FIG. 20.

In operation 1903, the electronic device 101 (e.g., the mobile terminal device 290) may receive a communication signal 2021, 2022, 2023, and 2024 of a second type from an OBU included in a vehicle 2011, 2012, 2013, and 2104 on a road 2000.

In operation 1905, the electronic device 101 (e.g., the mobile terminal device 290) may determine whether to activate a transmission circuit using information included in the communication signal of the first type and information included in the communication signal of the second type. For example, the electronic device 101 (e.g., the mobile terminal device 290) may receive a communication signal from the RSU 2001, and may obtain the identification information of the RSU 2001 included in the communication signal, as illustrated in FIG. 20. The electronic device 101 (e.g., the mobile terminal device 290) may determine the speed of the vehicle 2011, 2012, 2013, and 2014 from the communication signal 2021, 2022, 2023, and 2024 of the second type. When the speed of the vehicle 2011, 2012, 2013, and 2014 is less than or equal to a threshold value, the electronic device 101 (e.g., the mobile terminal device 290) may not transmit a communication signal, or may transmit a communication signal at relatively long intervals. For example, while the vehicles 2011, 2012, 2013, and 2014 in a congested area, the probability of a pedestrian being in danger is relatively low. Accordingly, the electronic device 101 (e.g., the mobile terminal device 290) may determine whether to transmit a communication signal or a transmission condition, based on the speed of the vehicle 2011, 2012, 2013, and 2014. After the congestion is alleviated, when a vehicle 2015 moves at relatively fast speed, the electronic device 101 (e.g., the mobile terminal device 290) may determine the speed of the vehicle 2015, based on a communication signal 2025 including a BSM. When the speed of the vehicle 2015 exceeds a threshold value, the electronic device 101 (e.g., the mobile terminal device 290) may transmit a communication signal 2031 upon reception of the identification information of the RSU 2001, or may transmit the communication signal 2031 at relatively short intervals.

A communication circuit (e.g., the communication module 190) according to various embodiments may include a reception circuit and a transmission circuit. A processor (e.g., the processor 120) may be configured to: receive at least one piece of identification information corresponding to at least one external electronic device for providing a traffic-related signal to at least one vehicle outside the electronic device (e.g., the electronic device 101), via the reception circuit; identify the position of the electronic device (e.g., the electronic device 101), based at least on the at least one piece of identification information; and activate the transmission circuit to transmit movement-related information of the electronic device (e.g., the electronic device 101) to the at least one vehicle or to the at least one external electronic device, based at least on the position.

The processor (e.g., the processor 120) according to various embodiments may be configured to: perform activation when the position falls within a traffic zone; and transmit the movement-related information to the at least one vehicle or the external electronic device using the transmission circuit.

The processor (e.g., the processor 120) according to various embodiments may be configured to: identify a type of the at least one external electronic device based at least on the at least one piece of identification information; and determine that the position falls within the traffic zone when the type is a roadside unit.

The processor (e.g., the processor 120) according to various embodiments may be configured to: identify the distance between the electronic device (e.g., the electronic device 101) and the external electronic device; and control a reception interval, based at least on the distance.

The processor (e.g., the processor 120) according to various embodiments may be configured to include Personal Safety Message (PSM) data as at least a part of the movement-related information.

The processor (e.g., the processor 120) according to various embodiments may be configured to: determine whether a signal associated with position information is received via a position measurement module (e.g., a GPS module); activate the reception circuit when the signal is received; and perform reception.

A processor (e.g., the processor 120) according to various embodiments may be configured to: receive at least one piece of traffic zone information corresponding to at least one external electronic device for providing a traffic-related signal to at least one vehicle outside the electronic device (e.g., the electronic device 101), via the reception circuit; and activate the transmission circuit so as to transmit movement-related information of the electronic device (e.g., the electronic device 101) to the at least one vehicle or the at least one external electronic device when the position of the electronic device (e.g., the electronic device 101) falls within the at least one traffic zone.

The processor (e.g., the processor 120) according to various embodiments may be configured to: receive a signal associated with position information via a position measurement module (e.g., a GPS module); and compare the position information of the electronic device (e.g., the electronic device 101) included in the signal and the traffic zone information so as to activate the transmission circuit according to the comparison result.

The processor (e.g., the processor 120) according to various embodiments may be configured to include Personal Safety Message (PSM) data as at least part of the movement-related information.

The processor (e.g., the processor 120) according to various embodiments may be configured to: activate the reception circuit in a state in which the transmission circuit is inactivated so as to receive at least one of first identification information corresponding to at least one external electronic device and second identification information corresponding to the vehicle via the reception circuit for providing a traffic-related signal to a vehicle outside the electronic device (e.g., the electronic device 101); and activate the transmission circuit in response to the reception of at least one of the first identification information and the second identification information so as to transmit a communication signal including at least one of position information of the electronic device (e.g., the electronic device 101) and movement information of the electronic device A second processor (e.g., the sub-processor 123) according to various embodiments may be connected to at least one of the at least one sensor module and the position measurement module, and may be configured to process at least one of the movement information of the electronic device and the position information of the electronic device.

According to various embodiments, when the first processor (e.g., the main processor 121) is in a sleep state, the second processor (e.g., the sub-processor 123) may be configured to perform control so as to activate the transmission circuit in response to the reception of at least one of the first identification information and the second identification information via the reception circuit; and when the first processor (e.g., the main processor 121) is in a wake-up state, the first processor (e.g., the main processor 121) may be configured to perform control so as to activate the transmission circuit in response to the reception of at least one of the first identification and the second identification via the reception circuit.

According to various embodiments, when at least one of the position information of the electronic device (e.g., the electronic device 101) and the movement information of the electronic device (e.g., the electronic device 101) satisfies a designated condition, the second processor (e.g., the sub-processor 123) may be configured to wake up the first processor (e.g., the main processor 121).

According to various embodiments, when the first processor (e.g., the main processor 121) is in the sleep state, the second processor (e.g., the sub-processor 123) may be configured to perform control so as to transmit a first communication signal including first information, via the transmission circuit; and when the first processor (e.g., the main processor 121) is in a wake-up state, the first processor (e.g., the main processor 121) may be configured to perform control so as to transmit a second communication signal including second information, which is different from the first information, via the transmission circuit.

According to various embodiments, the first information includes information associated with a first data field part of multiple data fields of a Personal Safety Message (PSM), and the second information includes information associated with a second data field part of the multiple data fields of the PSM, or the first information and the second information may be information associated with at least some identical data fields of the PSM.

The processor (e.g., the processor 120) may be configured to: identify a distance between the electronic device (e.g., the electronic device 101) and the external electronic device, or a distance between the electronic device (e.g., the electronic device 101) and the vehicle; and determine at least one of whether to transmit the communication signal, a transmission strength of the communication signal, and a transmission interval of the communication signal, based on the distance between the electronic device (e.g., the electronic device 101) and the external electronic device or the distance between the electronic device (e.g., the electronic device 101) and the vehicle.

The processor (e.g., the processor 120) may be configured to: identify a degree of movement of the electronic device (e.g., the electronic device 101); and activate the reception circuit when the degree of movement of the electronic device (e.g., the electronic device 101) exceeds a designated value.

The processor (e.g., the processor 120) may be configured to: determine whether the electronic device (e.g., the electronic device 101) is located indoors or outdoors; and perform control so as to inactivate the reception circuit when the electronic device (e.g., the electronic device 101) is located indoors, and to activate the reception circuit when the electronic device (e.g., the electronic device 101) is located outdoors.

The processor (e.g., the processor 120) may be configured to: further receive additional information, together with the second identification information, from the vehicle via the reception circuit; and determine at least one of whether to transmit the communication signal, a transmission strength of the communication signal, and a transmission interval of the communication signal, based at least on the additional information.

The additional information is speed information of the vehicle, and the processor (e.g., the processor 120) according to various embodiments may be configured to perform control so as to transmit the communication signal when the speed of the vehicle exceeds a designated value.

A method of operating an electronic device according to various embodiments may include: receiving at least one piece of identification information corresponding to at least one external electronic device for providing a traffic-related signal to at least one vehicle outside the electronic device, via the reception circuit; identifying the position of the electronic device based at least on the at least one piece of identification information; and activating the transmission circuit of the electronic device to transmit movement-related information of the electronic device to the at least one vehicle or the at least one external electronic device based at least on the position.

The operation of activating the transmission circuit of the electronic device according to various embodiments may include: performing activation when the position falls within a traffic zone; and transmitting the movement-related information to the at least one vehicle or the external electronic device using the transmission circuit.

When the position according to various embodiments falls within the traffic zone, the operation of activating may include: identifying the type of the at least one external electronic device based at least one the at least one piece of identification information; and determining that the position falls within the traffic zone when the type of external electronic device is a roadside unit.

The method of operating the electronic device according to various embodiments may further include: identifying the distance between the electronic device and the external electronic device; and controlling a reception interval, based at least on the distance.

The method of operating the electronic device according to various embodiments may further include: including Personal Safety Message (PSM) data as at least a part of the movement-related information.

The method of operating the electronic device according to various embodiments may further include: determining whether a signal related to the position information of the electronic device is received; and activating the reception circuit when the signal is received.

The method of operating the electronic device according to various embodiments may include: receiving at least one piece of traffic zone information corresponding to at least one external electronic device for providing a traffic-related signal to at least one vehicle outside the electronic device; and activating the transmission circuit of the electronic device so as to transmit movement-related information of the electronic device to the at least one vehicle or the at least one external electronic device when the position of the electronic device falls within the at least one traffic zone.

The operation of activating the transmission circuit of the electronic device according to various embodiments may include: receiving a signal related to position information of the electronic device; and comparing the position information of the electronic device included in the signal and the traffic zone information so as to activate the transmission circuit according to the comparison result.

The method of operating the electronic device according to various embodiments may further include: including Personal Safety Message (PSM) data as at least a part of the movement-related information.

The method of operating the electronic device according to various embodiments may include: activating the reception circuit in the state in which the transmission circuit of the electronic device is inactivated, so as to receive at least one of first identification information corresponding to at least one external electronic device for providing a traffic-related signal to a vehicle outside the electronic device (e.g., the electronic device 101) and second identification information corresponding to the vehicle via the reception circuit of the electronic device; activating the transmission circuit in response to the reception of at least one of the first identification information and the second identification information; and transmitting a communication signal including at least one of position information of the electronic device and movement information of the electronic device.

The method of operating the electronic device according to various embodiments may further include: sensing movement information of the electronic device; and sensing position information of the electronic device.

The method of operating the electronic device according to various embodiments may further include: when a first processor of the electronic device is in the sleep state, activating, by the second processor of the electronic device, the transmission circuit in response to the reception of at least one of the first identification information and the second identification information via the reception circuit; and when the first processor is in the wake-up state, activating, by the first processor, the transmission circuit in response to the reception of at least one of the first identification information and the second identification information via the reception circuit.

The method of operating the electronic device according to various embodiments may further include: waking up the first processor by the second processor when at least one of the position information of the electronic device and the movement information of the electronic device satisfies a previously designated condition.

The method of operating the electronic device according to various embodiments may include: when the first processor is in the sleep state, transmitting, by the second processor, a first communication signal including first information via the transmission circuit; and when the first processor is in the wake-up state, transmitting, by the first processor, a second communication signal including second information, which is different from the first information, via the transmission circuit.

The first information according to various embodiments may include information associated with a first data field part of multiple data fields of a Personal Safety Message (PSM), and the second information may include information associated with a second data field part of the multiple data fields of the PSM. Alternatively, the first information and the second information may be at least some identical data fields of the PSM.

The method of operating the electronic device according to various embodiments may further include: identifying the distance between the electronic device and the external electronic device, or the distance between the electronic device and the vehicle; and determining at least one of whether to transmit the communication signal, the transmission strength of the communication signal, or the transmission interval of the communication signal, based at least on the distance between the electronic device and the external electronic device or the distance between the electronic device and the vehicle.

The operation of activating the transmission circuit according to various embodiments may include: identifying the degree of movement of the electronic device; and activating the reception circuit when the degree of movement of the electronic device exceeds a previously designated value.

The method of operating the electronic device according to various embodiments may further include: determining whether the electronic device is located indoors or outdoors; and inactivating the reception circuit when the electronic device is located indoors, or activating the reception circuit when the electronic device is located outdoors.

The method of operating the electronic device according to various embodiments may further include: receiving additional information, together with the second identification information, from the vehicle via the reception circuit; and determining at least one of whether to transmit the communication signal, the transmission strength of the communication signal, and the transmission interval of the communication signal, based at least on the additional information.

The additional information according to various embodiments may be information associated with the speed of the vehicle, and the operation of determining at least one of whether to transmit the communication signal, the transmission intensity of the communication signal, and the transmission interval of the communication signal based on the additional information may include an operation of transmitting the communication signal when the speed of the vehicle exceeds a previously designated value.

The electronic device according to various embodiments disclosed herein may be various types of devices. The electronic device may, for example, and without limitation, include at least one of a portable communication device (e.g., smartphone) a computer device, a portable multimedia device, a portable medical device, a camera, a wearable device, and a home appliance, or the like. The electronic device according to one embodiment is not limited to the above described devices.

Various embodiments and the terms used therein are not intended to limit the disclosure herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. In the present disclosure, the expression "A or B", "at least one of A and/or B", or "at least one of A, B, and/or C" may include all possible combinations of the items listed. The expression "a first", "a second", "the first", or "the second" used in various embodiments may be used to modify various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element).

The term "module" as used herein may include a unit including hardware, software, or firmware, or any combinations thereof, and may, for example, be used interchangeably with the term "logic", "logical block", "component", "circuit", or the like. The "module" may be an integrated component, or a minimum unit for performing one or more functions or a part thereof. For example, the module may be implemented by an application-specific integrated circuit (ASIC).

Various embodiments as described herein may be implemented by software (e.g., program 140) including an instruction stored in machine-readable storage media (e.g., internal memory 136 or external memory 138). The machine may, for example, include a device that calls the stored instruction from the storage media and can operate according to the called instruction, and may include an electronic device (e.g., electronic device 101) according to the disclosed embodiments. The instruction, when executed by a processor (e.g., processor 120), may cause the processor to directly execute a function corresponding to the instruction or cause other elements to execute the function under the control of the processor. The instruction may include a code that is generated or executed by a compiler or interpreter. The machine-readable storage media may be provided in the form of non-transitory storage media. Here, the term "non-transitory" may refer, for example, to storage media that is tangible, irrespective of whether data is semi-permanently or transitorily stored in the storage media.

According to an embodiment, the method according to various embodiments disclosed in the present disclosure may be provided by being included in a computer program product. The computer program product may be traded between a seller and a purchaser as a product. The computer program product may be distributed online in the form of a machine-readable storage medium (e.g., a compact disc read only memory (CD-ROM)), or via an application store (e.g., Play Store). In the case of online distribution, at least a part of the computer program product may be at least temporarily stored or temporarily generated in a storage medium, such as the server of a manufacturer company, the server of an application store, or the memory of a relay server.

Each element (e.g., module or program) according to various embodiments may be configured to include a single entity or multiple entities, and some sub-elements of the above-described sub-elements may be omitted, or other sub-elements may be further included. Alternatively or additionally, some elements (e.g., modules or programs) may be integrated into one entity, and may perform functions which are the same as or similar to the functions executed by each element before they are integrated. Operations performed by a module, a programming module, or other elements according to various embodiments may be executed sequentially, in parallel, repeatedly, or in a heuristic manner. At least some operations may be executed according to another sequence, may be omitted, or may further include other operations.

According to various embodiments, a storage medium stores instructions, and when the instructions are executed by at least one processor, the instructions are configured to enable the at least one processor to perform at least one operation, the at least one operation including: receiving at least one piece of identification information corresponding to at least one external electronic device for providing a traffic-related signal to at least one vehicle outside the electronic device; identifying the position of the electronic device, based at least on the at least one piece of identification information; and activating the transmission circuit so as to transmit movement-related information of the electronic device to the at least one vehicle or the at least one external electronic device, based at least on the position.

The at least one operation may include: receiving at least one piece of traffic zone information corresponding to at least one external electronic device for providing a traffic-related signal to at least one vehicle outside the electronic device; and activating the transmission circuit of the electronic device so as to transmit movement-related information of the electronic device to the at least one vehicle or the at least one external electronic device when the position of the electronic device falls within the at least one traffic zone.

The at least one operation may include: activating the reception circuit in the state in which the transmission circuit of the electronic device is inactivated so as to receive at least one of first identification information, corresponding to at least one external electronic device for providing a traffic-related signal to a vehicle outside the electronic device, and second identification information, corresponding to the vehicle, via the reception circuit of the electronic device; and activating the transmission circuit in response to the reception of at least one of the first identification information and the second identification information so as to transmit a communication signal including at least one of position information of the electronic device and movement information of the electronic device.

Various embodiments disclosed herein are provided to easily describe technical details of the present disclosure and to aid in the understanding of the present disclosure, and are not intended to limit the scope of the present disclosure. Therefore, it should be understood that all modifications and changes or modified and changed forms based on the technical idea of the present disclosure fall within the scope of the present disclosure.

What is claimed is:

1. An electronic device, comprising:
   a communication circuit comprising a reception circuit and a transmission circuit; and
   a processor, wherein the processor is configured to:
   receive, from at least one external electronic device via the reception circuit, at least one piece of identification information corresponding to the at least one external electronic device which is broadcasted by the at least one external electronic device;
   in response to identifying that the at least one external electronic device includes a roadside unit for providing a traffic-related signal to at least one vehicle outside the electronic device based at least on the at least one piece of identification information, activate the transmission circuit to transmit movement-related information of the electronic device.

2. The electronic device of claim 1, wherein the processor is configured to:
   determine a distance between the electronic device and the at least one external electronic device; and
   adjust an interval of the reception, based at least on the determined distance.

3. The electronic device of claim 1, wherein the processor is configured to include Personal Safety Message (PSM) data as at least a part of the movement-related information.

4. The electronic device of claim 1, further comprising a position measurement module comprising position measurement circuitry,
   wherein the processor is configured to:
   determine, via the position measurement module, whether a signal associated with position information is received;
   activate the reception circuit in response to identifying that the signal is received.

5. An electronic device, comprising:
   a communication circuit comprising a transmission circuit and a reception circuit; and
   at least one processor, wherein the at least one processor is configured to:
   activate the reception circuit in a state in which the transmission circuit is inactivated, to receive, from at least one external electronic device via the reception circuit, at least one of first identification information corresponding to the at least one external electronic device and broadcasted by the at least one external electronic device for providing a traffic-related signal to a vehicle outside the electronic device or second identification information corresponding to the vehicle and broadcasted by the vehicle; and
   activate the transmission circuit in response to receiving at least one of the first identification information or the second identification information and transmit a communication signal including at least one of information on position of the electronic device or information on movement of the electronic device.

6. The electronic device of claim 5, further comprising:
   at least one sensor module comprising at least one sensor configured to sense the information on movement of the electronic device; and
   a position measurement module comprising position measurement circuitry configured to sense the information on position of the electronic device, wherein the at least one processor comprises: a first processor; and a second processor that is connected to at least one of the at least one sensor module or the position measurement module, wherein the second processor is configured to process at least one of the information on movement of the electronic device or the information on position of the electronic device.

7. The electronic device of claim 6, wherein the electronic device is configured such that:

when the first processor is in a sleep state, the second processor is configured to activate the transmission circuit in response to receiving at least one of the first identification information or the second identification information via the reception circuit; and when the first processor is in a wake-up state, the first processor is configured to activate the transmission circuit in response to receiving at least one of the first identification or the second identification via the reception circuit.

8. The electronic device of claim 7, wherein the second processor is configured to wake up the first processor when at least one of the information on position of the electronic device or the information on movement of the electronic device satisfies a designated condition.

9. The electronic device of claim 7, wherein the electronic device is configured such that:

when the first processor is in the sleep state, the second is configured to transmit a first communication signal including first information via the transmission circuit; and when the first processor is in a wake-up state, the first processor is configured to transmit a second communication signal including second information, which is different from the first information, via the transmission circuit.

10. The electronic device of claim 9, wherein the first information includes information on a first data field of a plurality of data fields of a Personal Safety Message (PSM), and the second information includes information on a second data field of the plurality of data fields of the PSM; or the first information includes first data corresponding to a third data field of the plurality of data fields of the PSM, and the second information includes second data corresponding to the third data field of the plurality of data fields of the PSM.

11. The electronic device of claim 5, wherein the at least one processor is configured to:

identify a distance between the electronic device and the external electronic device, or a distance between the electronic device and the vehicle; and determine at least one of: whether to transmit the communication signal, a transmission strength of the communication signal, or a transmission interval of the communication signal, based at least on the distance between the electronic device and the external electronic device or the distance between the electronic device and the vehicle.

12. The electronic device of claim 5, wherein the at least one processor is configured to:

determine a degree of movement of the electronic device; and activate the reception circuit when the degree of movement of the electronic device satisfies a designated condition.

13. The electronic device of claim 5, wherein the at least one processor is configured to:

determine whether the electronic device is located indoors or outdoors; and inactivate the reception circuit when the electronic device is located indoors, and activate the reception circuit when the electronic device is located outdoors.

14. The electronic device of claim 5, wherein the at least one processor is configured to:

receive additional information from the vehicle via the reception circuit; and determine at least one of: whether to transmit the communication signal, a transmission strength of the communication signal, or a transmission interval of the communication signal, based at least on the additional information.

15. The electronic device of claim 14, wherein the additional information comprises information on speed of the vehicle, and the at least one processor is configured to transmit the communication signal when a speed of the vehicle satisfies a designated condition.

* * * * *